(12) United States Patent
Mizushiro

(10) Patent No.: US 9,160,891 B2
(45) Date of Patent: Oct. 13, 2015

(54) IMAGE PROCESSING METHOD, IMAGE PROCESSOR, AND IMAGE DISPLAY SYSTEM

(75) Inventor: Kenji Mizushiro, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 287 days.

(21) Appl. No.: 13/530,908

(22) Filed: Jun. 22, 2012

(65) Prior Publication Data

US 2013/0016118 A1    Jan. 17, 2013

(30) Foreign Application Priority Data

Jul. 11, 2011    (JP) ................................. 2011-152739

(51) Int. Cl.
*H04N 1/60*    (2006.01)
*H04N 9/31*    (2006.01)

(52) U.S. Cl.
CPC ........... *H04N 1/6027* (2013.01); *H04N 9/3147* (2013.01); *H04N 9/3182* (2013.01); *H04N 9/3194* (2013.01)

(58) Field of Classification Search
CPC . H04N 9/3147; H04N 9/3182; H04N 9/3194; H04N 21/4318; H04N 21/44008; H04N 5/57; H04N 1/6027
See application file for complete search history.

(56) References Cited

U.S. PATENT DOCUMENTS

| 4,527,197 A * | 7/1985 | Nolte ............................. 348/687 |
| 2002/0075277 A1 | 6/2002 | Naito et al. |
| 2002/0180999 A1 | 12/2002 | Kanai |
| 2003/0058202 A1 * | 3/2003 | Evanicky et al. ............... 345/82 |
| 2005/0057486 A1 * | 3/2005 | Aoki et al. ..................... 345/102 |
| 2005/0270265 A1 * | 12/2005 | Plut ................................ 345/102 |
| 2006/0232502 A1 * | 10/2006 | Yoshida ......................... 345/48 |
| 2006/0274026 A1 * | 12/2006 | Kerofsky ...................... 345/102 |
| 2008/0100554 A1 * | 5/2008 | Mori .............................. 345/89 |
| 2009/0274389 A1 * | 11/2009 | Yamamoto .................... 382/274 |
| 2009/0284544 A1 * | 11/2009 | Nobori .......................... 345/589 |
| 2010/0309213 A1 * | 12/2010 | Chen et al. ..................... 345/589 |

FOREIGN PATENT DOCUMENTS

| JP | A-2001-209358 | 8/2001 |
| JP | A-2002-262304 | 9/2002 |
| JP | A-2005-352171 | 12/2005 |
| JP | 2008-020822 A | 1/2008 |
| JP | A-2011-150111 | 8/2011 |

* cited by examiner

*Primary Examiner* — Jingge Wu
(74) *Attorney, Agent, or Firm* — Oliff PLC

(57) ABSTRACT

An image processing method, which performs color correction on a superimposed image obtained by superimposing a first image formed by a first image forming unit and a second image formed by a second image forming unit, includes controlling the dimming of the first image forming unit and the second image forming unit on the basis of dimming rates set in the first image forming unit and the second image forming unit in response to a given designated dimming rate, and performing a color correction process on image signals corresponding to the first image forming unit and the second image forming unit using a color correction value corresponding to the dimming rates of the first image forming unit and the second image forming unit.

10 Claims, 28 Drawing Sheets

| DESIGNATED DIMMING RATE | DIMMING RATE OF FIRST PROJECTOR | DIMMING RATE OF SECOND PROJECTOR |
|---|---|---|
| $\delta 1$ | $\alpha 1$ | $\beta 1$ |
| $\delta 2$ | $\alpha 2$ | $\beta 2$ |
| ⋮ | ⋮ | ⋮ |

FIG. 3

↓ UNEVENNESS CORRECTION                   ↓ UNEVENNESS CORRECTION

↓ STACK

↓ 1/2 LIGHT REDUCTION

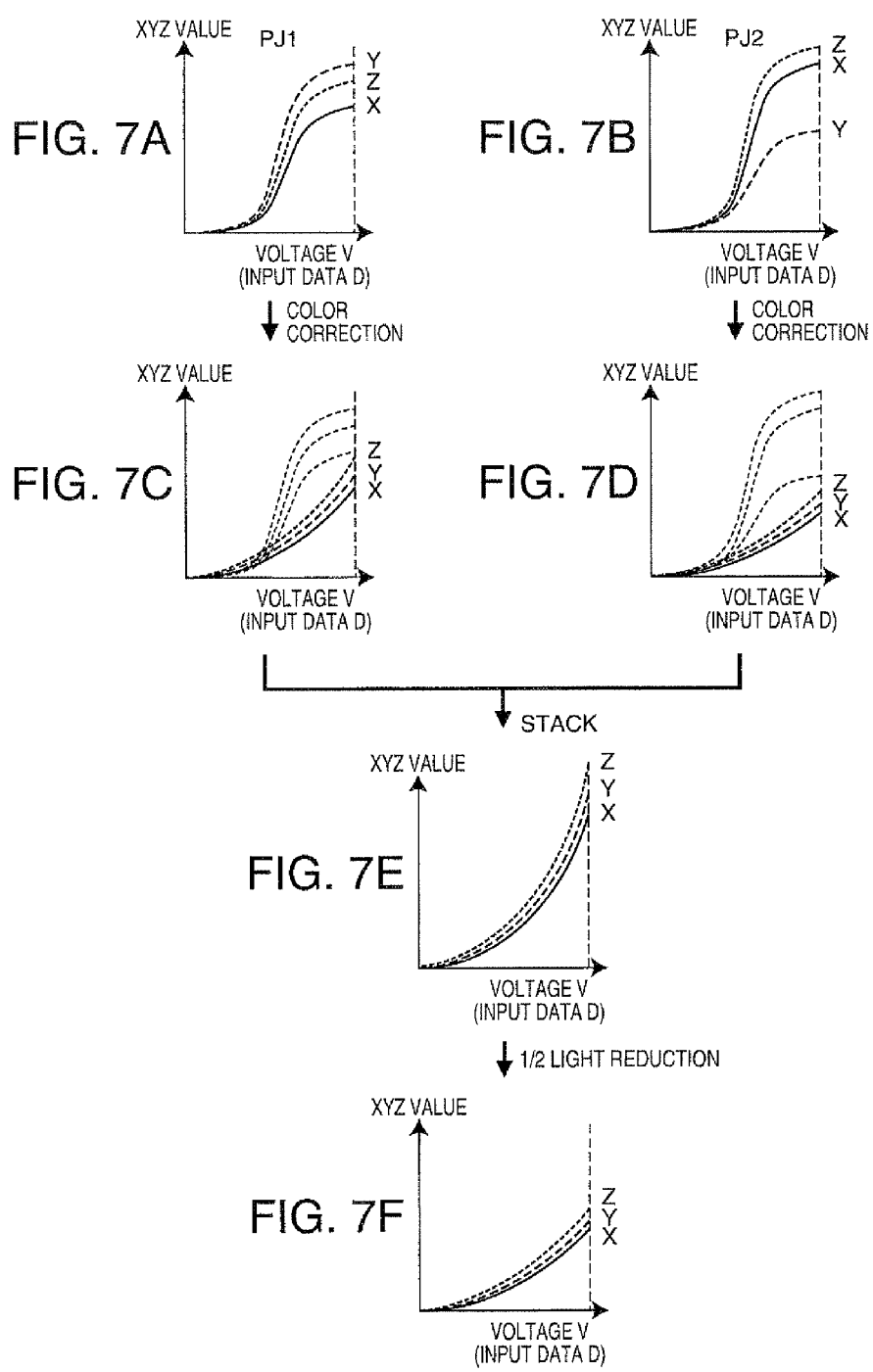

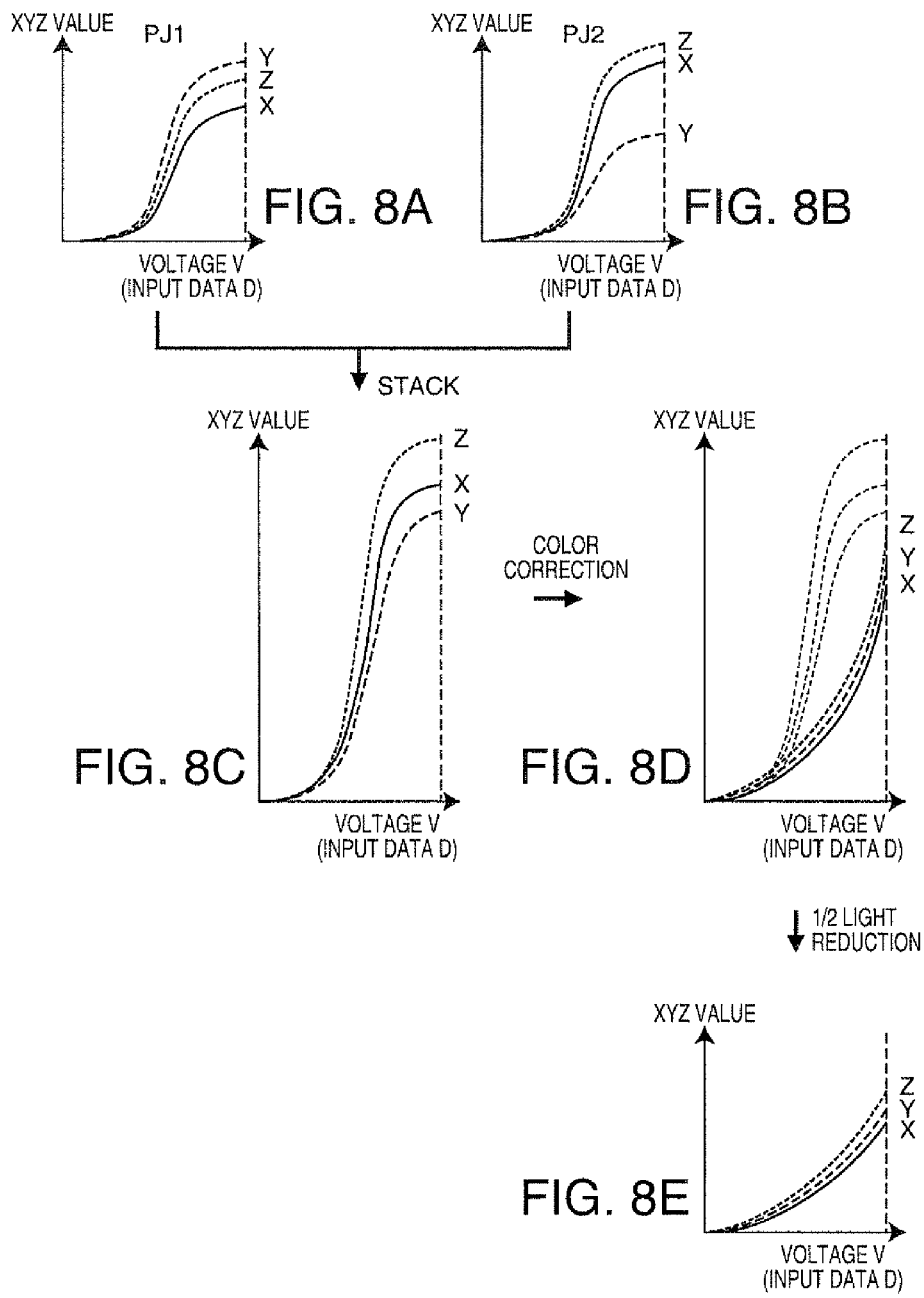

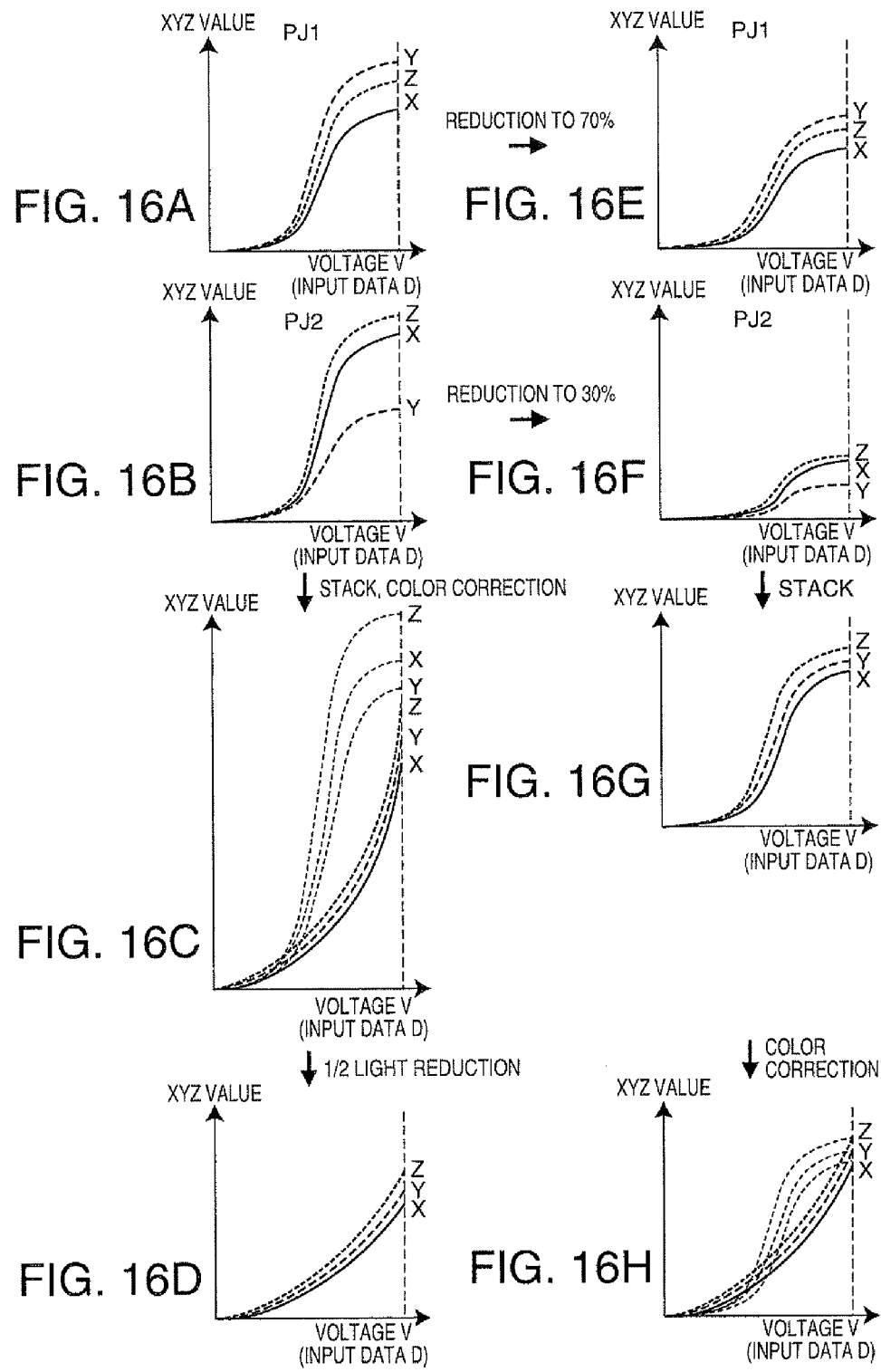

| IN-SCREEN POSITION | | P1 | P2 | P3 | P4 | P5 | P6 | P7 | P8 | P9 |
|---|---|---|---|---|---|---|---|---|---|---|
| PJ1 (BEFORE CORRECTION) | Xw1 | 170 | 175 | 165 | 160 | 150 | 175 | 180 | 175 | 190 |
| | Yw1 | 170 | 150 | 170 | 165 | 175 | 170 | 165 | 175 | 180 |
| | Zw1 | 185 | 190 | 175 | 175 | 166 | 180 | 195 | 185 | 185 |
| PJ2 (BEFORE CORRECTION) | Xw2 | 160 | 150 | 160 | 165 | 175 | 170 | 155 | 150 | 140 |
| | Yw2 | 150 | 160 | 145 | 130 | 130 | 140 | 150 | 155 | 150 |
| | Zw2 | 175 | 155 | 195 | 160 | 187 | 175 | 175 | 175 | 170 |
| $\alpha=0.5$ $\beta=0.5$ | X | 140.4 | 130.5 | 138.5 | 119.9 | 129.2 | 124.5 | 133.8 | 151.6 | 149.2 |
| | Y | 147.7 | 140.5 | 145.7 | 126.2 | 135.9 | 131 | 140.8 | 159.5 | 157 |
| | Z | 160.9 | 153 | 158.6 | 137.4 | 148 | 142.6 | 153.3 | 173.7 | 171 |
| $\alpha=0.65$ $\beta=0.35$ | X | 144.4 | 127.6 | 144.3 | 130.1 | 144.6 | 131.8 | 134.5 | 153.6 | 150.4 |
| | Y | 152 | 134.2 | 151.8 | 136.8 | 152.1 | 138.7 | 141.5 | 161.6 | 158.3 |
| | Z | 165.5 | 146.2 | 165.4 | 149 | 165.6 | 151.1 | 154.1 | 176 | 172.3 |

FIG. 26

IMAGE PROCESSING METHOD, IMAGE PROCESSOR, AND IMAGE DISPLAY SYSTEM

BACKGROUND

1. Technical Field

The present invention relates to an image processing method, an image processor, and an image display system.

2. Related Art

As a technique for improving resolution and brightness of a projector, a stack display technique in which images projected from a plurality of projectors are stacked to display one image is known. Similarly to an image displayed by a single projector, a stack image has luminance unevenness or color unevenness. In general, correction of luminance unevenness or color unevenness is performed on the entire screen based on the darkest portion within the screen when white display is performed (that is, when an image of white which is the brightest image from among images to be displayed by a projector is displayed). As a result of correction, brightness of white is degraded.

FIGS. 28A and 28B are explanatory views of a general unevenness correction principle. FIG. 28A shows an example of a change in luminance in a horizontal direction of a screen as the state of luminance unevenness when white display is performed for simplification of description. FIG. 28B schematically shows the change in luminance of FIG. 28A in a stepwise manner. In FIGS. 28A and 28B, the horizontal axis represents the pixel position of the screen and the vertical axis represents luminance (in a broad sense, intensity).

The change in luminance shown in FIG. 28A when white display is performed is viewed as image unevenness. In this case, in general, correction is performed such that the luminance of each position has the minimum value Ymin when the minimum value Ymin of luminance shown in FIGS. 28A and 28B is set as a target value for unevenness correction. This is because, when white display is performed, the whole portion may not be increased in luminance, such that, if the luminance of a portion other than the darkest portion is set as a target value for unevenness correction, the luminance of the darkest portion may not conform to the target value. For this reason, unevenness correction for improving display quality is performed in a direction in which brightness of white is degraded.

A projector has an inherent color characteristic, and if no correction is performed, the display characteristic may be considerably shifted from the standard colors, such as sRGB (standard RGB). If correction (color correction) is performed to match the colors to the target color, this causes the degradation of brightness of the projector.

FIG. 29 is an explanatory view of a general color correction principle. FIG. 29 schematically shows the state where a target output luminance characteristic to be displayed and an actual characteristic (actual device characteristic) of a projector are associated with each other using LUT (Look-Up Table) data in which unevenness correction values are tabulated.

For example, in order to realize transmittance T0 when a voltage V0 is applied, it is necessary to apply a voltage V1 according to the actual characteristic inherent in the projector. Accordingly, a search is carried out for the actual characteristics (input/output characteristics) of the projector measured in advance to create LUT data shown in FIG. 29. In the color correction, the voltage for realizing transmittance T0 is corrected to a voltage specific to the projector using LUT data. When a single liquid crystal panel as an optical modulator is provided, LUT data can be set directly by a single search.

Meanwhile, in a projector using color composition of RGB, each of RGB has XYZ components, LUT data of R, G, and B may not be simply obtained from the search results of X, Y, and Z, and it is necessary to perform a search taking color mixture into consideration.

Various methods of improving luminance unevenness and color unevenness appropriate for a stack image have been suggested. For example, JP-A-2005-352171 describes a technique which calculates an intensity profile totaled for respective light source colors (RGB) and performs color unevenness correction such that evenness is achieved in a stack state where a stack image (superimposed image) is displayed, instead of performing color unevenness correction for respective projectors. According to the technique described in JP-A-2005-352171, it is not necessary that color unevenness is reduced for the respective projectors, and it should suffice that color unevenness of a stack image is reduced even if the individual images are uneven in color.

There is demand for power saving in an electronic apparatus, such as a projector. Accordingly, a projector which has a dimming function of adjusting brightness of a light source, thereby displaying an image while reducing power consumption is considered.

On the other hand, unevenness correction and dimming of the light source may cause degradation in brightness. These techniques are independent, and at worst, the degradation in overall brightness can be expressed by simply multiplying a reduction ratio of brightness according to the degree of unevenness correction, a reduction ratio of brightness according to the degree of color correction, and a reduction ratio of the light source. For example, when brightness becomes 60% by color correction, brightness becomes 70% by unevenness correction, and the light source is reduced to 60% so as to achieve low power consumption of 40%, this means that the amount of light loss of 75% ($\cong 1-0.6\times0.7\times0.6$) is caused.

Focusing on brightness after color correction and dimming on a stack image displayed by a first projector PJ1 and a second projector PJ2, even if the technique described in JP-A-2005-352171 is applied, an image reduced through just dimming is obtained. For this reason, even if the technique described in JP-A-2005-352171 is applied, there is a problem in that a stack image may not be displayed with optimum light use efficiency when dimming is performed.

SUMMARY

An advantage of some aspects of the invention is that it provides an image processing method, an image processor, and an image display system which can increase light use efficiency more than previously possible when displaying a stack image.

(1) A first aspect of the invention is directed to an image processing method which performs color correction on a superimposed image obtained by superimposing a first image formed by a first image forming unit and a second image formed by a second image forming unit. The method includes controlling the dimming of the first image forming unit and the second image forming unit on the basis of dimming rates set in the first image forming unit and the second image forming unit in response to a given designated dimming rate, and performing a color correction process on image signals corresponding to the first image forming unit and the second image forming unit using a color correction value corresponding to the dimming rates of the first image forming unit and the second image forming unit.

According to this aspect of the invention, the dimming of the image forming units is controlled on the basis of the dimming rates set in the image forming units in response to the designated dimming rate, and the color correction process is performed on the image signals corresponding to the image forming units using the color correction value corresponding to the dimming rates of the image forming units. Therefore, it is possible to control the luminance of the light sources of the image forming units with different dimming rates in cooperation with the color correction process, thereby improving the light use efficiency and displaying a brighter image with the same power consumption while realizing image display with a target chromaticity.

(2) A second aspect of the invention is directed to the image processing method according to the first aspect of the invention, wherein the color correction value is a color correction value which corresponds to a value obtained by totaling the color characteristic values of the first image and the second image in accordance with the dimming rates of the first image forming unit and the second image forming unit.

According to this aspect of the invention, the color correction value which corresponds to the value obtained by totaling the color characteristic values of the images to which the dimming rates of the image forming units are applied is used, and color correction is performed while the first image forming unit and the second image forming unit are regarded as a single image forming unit. Accordingly, it should suffice that the color correction value common to the image forming units is generated. For this reason, with this configuration, it is possible to achieve efficient color correction.

(3) A third aspect of the invention is directed to the image processing method according to the first or second aspect of the invention, wherein the method further includes calculating a color correction target value corresponding to the first image forming unit and the second image forming unit on the basis of a value obtained by totaling the color characteristic values of the first image and the second image in accordance with the dimming rates of the first image forming unit and the second image forming unit, and generating the color correction value corresponding to the first image forming unit and the second image forming unit on the basis of the color correction target value calculated in the calculating of the color correction target value. In the performing of the color correction process, the color correction process may be performed using the color correction value generated in the generating of the color correction value.

According to this aspect of the invention, the color correction target value which corresponds to the image forming units is calculated on the basis of the value obtained by totaling the color characteristic values of the images to which the dimming rates of the image forming units are applied, and color correction is performed using the color correction value generated on the basis of the color correction target value. With this configuration, it is possible to optimize color correction and dimming, to improve the light use efficiency, and to display a brighter image with the same power consumption while realizing image display with a target chromaticity.

(4) A fourth aspect of the invention is directed to the image processing method according to any of the first to third aspects of the invention, wherein the method further includes calculating the dimming rates of the first image forming unit and the second image forming unit on the basis of the designated dimming rate and the color characteristic values of the first image and the second image. In the controlling of the dimming, the dimming of the first image forming unit and the second image forming unit may be performed on the basis of the dimming rates calculated in the calculating of the dimming rates.

According to this aspect of the invention, the dimming rates of the image forming units are calculated on the basis of the designated dimming rate and the color characteristic values of the images from the image forming units. Therefore, it is possible to generate the dimming rates of the image forming units in cooperation with the color correction process.

(5) A fifth aspect of the invention is directed to the image processing method according to any of the first to fourth aspects of the invention, wherein the average value of the dimming rates of the first image forming unit and the second image forming unit are equal to the designated dimming rate.

According to this aspect of the invention, it is possible to reduce the load of a process for calculating the dimming rates for obtaining the above-described effects and to simply calculate the dimming rates.

(6) A sixth aspect of the invention is directed to the image processing method according to any of the first to fifth aspects of the invention, wherein the color correction process and the dimming of the first image forming unit and the second image forming unit are performed at each of a plurality of pixel positions within a screen to correct unevenness within the screen.

According to this aspect of the invention, it is possible to improve the light use efficiency and to display a brighter image with the same power consumption while realizing image display with an even target chromaticity without unevenness.

(7) A seventh aspect of the invention is provided with an image processor which performs color correction on a superimposed image obtained by superimposing a first image formed by a first image forming unit and a second image formed by a second image forming unit. The image processor includes a dimming control unit that controls the dimming of the first image forming unit and the second image forming unit on the basis of dimming rates set in the first image forming unit and the second image forming unit in response to a given designated dimming rate, a color correction target value calculation unit that calculates a color correction target value corresponding to the first image forming unit and the second image forming unit on the basis of a value obtained by totaling the color characteristic values of the first image and the second image in accordance with the dimming rates of the first image forming unit and the second image forming unit, and a color correction value generation unit that generates a color correction value corresponding to the first image forming unit and the second image forming unit on the basis of the color correction target value calculated by the color correction target value calculation unit.

According to this aspect of the invention, it is possible to provide an image processor which is capable of controlling the luminance of the light sources of the image forming units with different dimming rates in cooperation with the color correction process, improving the light use efficiency, and displaying a brighter image with the same power consumption while realizing image display with a target chromaticity.

(8) An eighth aspect of the invention is directed to the image processor according to the seventh aspect of the invention, wherein the image processor further includes a light source luminance calculation unit that calculates the dimming rates of the first image forming unit and the second image forming unit on the basis of the designated dimming rate and the color characteristic values of the first image and the second image. The dimming control unit may control the dimming of the first image forming unit and the second image forming unit on the basis of the dimming rates calculated by the light source luminance calculation unit.

According to this aspect of the invention, the dimming rates of the image forming unit are calculated on the basis of the designated dimming rate and the color characteristic values of the images from the image forming unit. Therefore, it is possible to generate the dimming rates of the image forming units in cooperation with the color correction process.

(9) A ninth aspect of the invention is directed to an image display system including the image processor according to the seventh or eighth aspect of the invention, a first image display device that has the first image forming unit whose dimming is controlled by the dimming control unit and performs a color correction process on an image signal corresponding to the first image forming unit using the color correction value generated in the image processor, and a second image display device that has the second image forming unit whose dimming is controlled by the dimming control unit and performs a color correction process on an image signal corresponding to the second image forming unit using the color correction value generated in the image processor.

According to this aspect of the invention, it is possible to provide an image display system which can improve light use efficiency and display a brighter image with the same power consumption while realizing image display with target chromaticity when displaying a stack image.

BRIEF DESCRIPTION OF THE DRAWINGS

The invention will be described with reference to the accompanying drawings, wherein like numbers reference like elements.

FIG. 3 is an explanatory view of a dimming rate storage unit.

FIGS. 7A to 7F are diagrams showing the state of brightness when dimming is performed after images of respective projectors subjected to color correction are stacked.

FIGS. 8A to 8E are diagrams showing the state of brightness when dimming is performed after color correction is performed on a stack image.

FIGS. 16A to 16H are diagrams showing the state of brightness when color correction and dimming are performed under the condition of dimming rates α=0.7 and β=0.3 according to the first embodiment.

FIG. 26 is an explanatory view of an example of a light source luminance calculation process according to the second embodiment.

DESCRIPTION OF EXEMPLARY EMBODIMENTS

Hereinafter, embodiments of the invention will be described in detail with reference to the drawings. The following embodiments do not unduly limit the contents of the invention described in the appended claims. Also, not all of configurations described below are constituent features essential for solving the problems of the invention.

Although in the following embodiments, an example where a stack image is displayed using two projectors (in a broad sense, image display devices) will be described, the invention may be applied to a case where a stack image is displayed using three or more projectors.

First Embodiment

Figure 1:
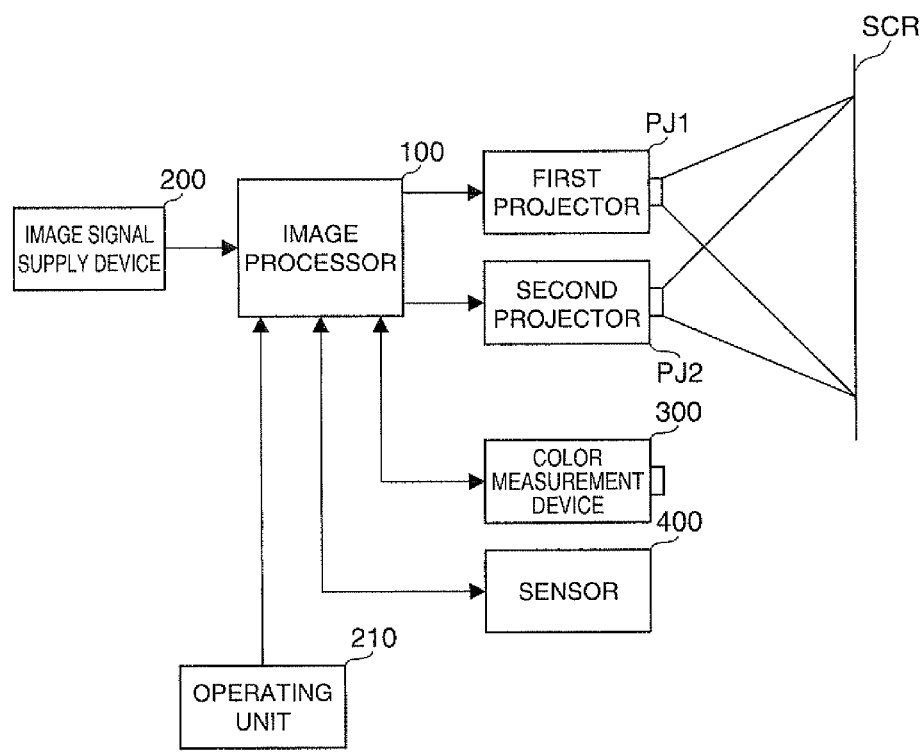
FIG. 1 is a block diagram of a configuration example of an image display system according to a first embodiment of the invention.

FIG. 1 is a block diagram of a configuration example of an image display system according to a first embodiment of the invention.

An image display system 10 displays a stack image, which is generated by superimposing a plurality of images projected from a plurality of projectors, on a screen SCR. The image display system 10 includes a first projector (first image display device) PJ1, a second projector (second image display device) PJ2, an image processor 100, an image signal supply device 200, and an operating unit 210. In order to achieve the optimization of color correction and dimming, the image display system 10 also includes a color measurement device 300 and a sensor 400. The operating unit 210 may be provided in the image processor 100, the first projector PJ1 or the second projector PJ2. Some or all of the functions of the image processor 100 may be provided in the first projector PJ1 or the second projector PJ2.

The first projector PJ1 includes a first image forming unit (not shown), and projects an image (first image) formed by the first image forming unit on the basis of an input image signal on the screen SCR. The first image forming unit includes a light source, an optical system (illumination optical system) which sends light from the light source to an optical modulator, a dichroic mirror, an optical modulator, such as a liquid crystal light valve, a color synthesis prism (X prism), a projection optical system, a driving circuit, and the like. The first image forming unit modulates and synthesizes the color components of light from the light source on the basis of the input image signal using the optical modulator and projects light after synthesis on the screen SCR through a projection lens. The first projector PJ1 is configured such that luminance is adjusted on the basis of a dimming control signal from the image processor 100. Similarly, the second projector PJ2 includes a second image forming unit (not shown) and projects an image (second image) formed by the second image forming unit on the basis of an input image signal on the screen SCR. The second projector PJ2 is configured such that luminance is adjusted on the basis of a dimming control signal from the image processor 100. At this time, the projectors are arranged such that the image projected from the second projector PJ2 is superimposed on the image projected from the first projector PJ1 on the screen SCR. Accordingly, a stack image (superimposed image) in which the images from the projectors are superimposed is displayed. The configuration of the second projector PJ2 is the same as the configuration of the first projector PJ1.

The image processor 100 generates a color correction value which is used to perform a color correction process corresponding to each projector on the input image signal in accordance with a designated dimming rate and controls the dimming of at least one of the first projector PJ1 and the second projector PJ2.

The image signal supply device 200 is a DVD (Digital Versatile Disc) device, a personal computer (PC), or the like, and supplies the image signal to the first projector PJ1 and the second projector PJ2. When the color correction process is performed in the image processor 100, the image signal supply device 200 supplies an image signal to the image processor 100. The image signal supply device 200 can supply an image signal corresponding to a measurement pattern during color measurement described below to the image processor 100. As the measurement pattern, a gray image in which the color components of RGB have the same gradation value, a RGB color solid image which has only the gradation value of one color component of RGB (the gradation values of other color components are 0), a patch image in which only a rectangular measurement region changes in color, or the like is used.

The operating unit 210 is an operation panel which is provided to designate the light source luminance of the first projector PJ1 and the second projector PJ2. The user can designate a dimming rate (for example, 50%) through the operating unit 210 or can designate one from among dimming rates set in advance. User's operation information through the operating unit 210 corresponds to a designated dimming rate and is input to the image processor 100.

The color measurement device 300 is a point measurement colorimeter and is arranged so as to measure the color of a measurement region within an image projected on the screen SCR. The function of the color measurement device 300 is realized by a spectroradiometer (for example, PR-705 manufactured by Photo Research, or the like) which includes a prism spectroscope and a linear array sensor. The color measurement device 300 may be realized by a colorimeter (for example, CL-200 manufactured by Konica Minolta, or the like) which includes an XYZ filter and a photocell. The color measurement device 300 captures the above-described gray image, solid image, or patch image displayed on the screen SCR by each projector when color measurement is performed. The color measurement device 300 acquires XYZ tristimulus values of the CIE 1931 colorimetric system as color characteristic values. The color measurement values acquired by the color measurement device 300 for the respective projectors are sent to the image processor 100 as color characteristic values. The measurement process in the color measurement device 300 may be performed under the control of the image processor 100. The function of the color measurement device 300 may be realized by using a measurement value at a measurement position from an in-plane intensity distribution (unevenness measurement values) measured by a known unevenness measurement device.

The sensor 400 detects the brightness, temperature, or the like of the visual environment, and sensor information corresponding to the detection result is input to the image processor 100. The image processor 100 acquires the designated dimming rate using the operation information from the operating unit 210 or the sensor information from the sensor 400.

The image processor 100 obtains a color correction target value of the image forming units on the basis of the dimming rates of the projectors corresponding to the designated dimming rate and the color measurement values of the images from the projectors acquired by the color measurement device 300, and obtains a color correction value corresponding to the color correction target value. The image processor 100 supplies the color correction value to the first projector PJ1 and the second projector PJ2 which perform the color correction process. At this time, the image processor 100 forcibly performs dimming control of the first projector PJ1 and the second projector PJ2 with the dimming rates of the projectors corresponding to the designated dimming rate designated by the operation information. Alternatively, the image processor 100 performs dimming control of the first projector PJ1 and the second projector PJ2 with the dimming rates of the projectors corresponding to the designated dimming rate determined on the basis of the sensor information from the sensor 400. Accordingly, the display of the target chromaticity is realized and the light use efficiency increases.

The image processor 100 can have a central processing unit (hereinafter, referred to as CPU) and a memory (not shown). In this case, the CPU reads a program stored in the memory and performs a process corresponding to the program, thereby realizing the above-described color correction process and dimming control. Alternatively, the function of the image processor 100 may be realized by a logic circuit, such as an ASIC (Application Specific Integrated Circuit).

Image Processor

Figure 2:
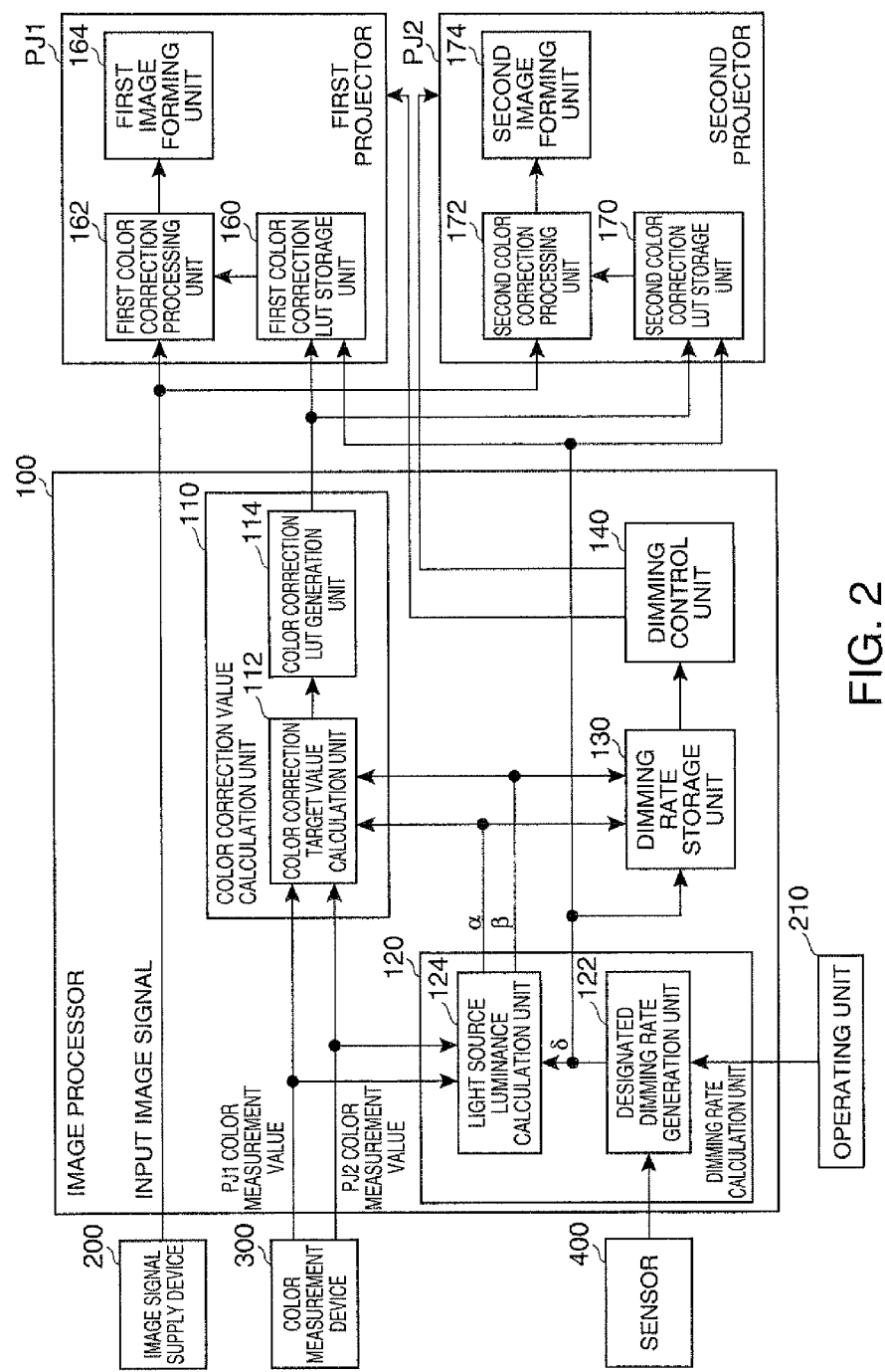
FIG. 2 is a block diagram of a configuration example of an image processor of FIG. 1.

FIG. 2 is a block diagram of a configuration example of the image processor 100 of FIG. 1. FIG. 2 shows the image signal supply device 200, the operating unit 210, the color measurement device 300, the sensor 400, the first projector PJ1, and the second projector PJ2 in addition to the image processor 100. In FIG. 2, the same portions as those in FIG. 1 are represented by the same reference numerals, and descriptions thereof will not be repeated.

The image processor 100 includes a color correction value calculation unit 110, a dimming rate calculation unit 120, a dimming rate storage unit 130, and a dimming control unit 140. The color correction value calculation unit 110 includes a color correction target value calculation unit 112 and a color correction look-up table (hereinafter, referred to as LUT) generation unit 114. The dimming rate calculation unit 120 includes a designated dimming rate generation unit 122 and a light source luminance calculation unit 124.

The color correction value calculation unit 110 generates a color correction value corresponding to the dimming rates of the projectors (specifically, the image forming units), and generates a color correction LUT in which color correction values are tabulated. The color correction target value calculation unit 112 calculates a color correction target value. The color correction target value is generated on the basis of the dimming rates of the projectors (or the designated dimming rate) and color measurement values of the images from the projectors acquired by the color measurement device 300. The color correction LUT generation unit 114 generates the color correction value on the basis of the color correction target value by the color correction target value calculation unit 112. The color correction value generated by the color correction LUT generation unit 114 is stored in the first projector PJ1 and the second projector PJ2.

The dimming rate calculation unit 120 calculates the dimming rates corresponding to the projectors from the designated dimming rate. The designated dimming rate generation unit 122 generates a designated dimming rate 6 corresponding to a target light source luminance from the operation information from the operating unit 210 or the sensor information from the sensor 400. The light source luminance calculation unit 124 calculates the target luminance of the projectors as dimming rates α and β on the basis of the designated dimming rate generated by the designated dimming rate generation unit 122 and the color measurement values of the projectors input from the color measurement device 300. The dimming rates α and β of the projectors calculated by the light source luminance calculation unit 124 are stored in the dimming rate storage unit 130 in association with the designated dimming rate δ.

The dimming rate storage unit 130 stores the dimming rates obtained for the projectors (the image forming units in the image display devices) in response to the designated dimming rate based on the operation information from the operating unit 210 or the sensor information from the sensor 400.

FIG. 3 is an explanatory view of the dimming rate storage unit 130.

Prior to the color correction process in the first embodiment, the dimming rates for the projectors are obtained in accordance with the designated dimming rate shown in FIG. 3, and the dimming rate storage unit 130 stores the dimming rates α and β for the projectors in response to the designated dimming rate δ. For example, when δ1 is designated as the designated dimming rate by the operation information from the operating unit 210 or the sensor information from the sensor 400, the dimming rate storage unit 130 is configured such that dimming rates α1 and β1 which are stored in response to the designated dimming rate δ1 are referenced.

Referring to FIG. 2, the dimming control unit 140 controls the dimming of the projectors with the dimming rates of the projectors corresponding to the designated dimming rate stored in the dimming rate storage unit 130. For this reason, the dimming control unit 140 outputs dimming control signals for controlling the luminance of the light sources of the projectors to the projectors.

The first projector PJ1 includes a first color correction LUT storage unit (first color correction value storage unit) 160, a first color correction processing unit 162, and a first image forming unit 164. The second projector PJ2 includes a second color correction LUT storage unit (second color correction value storage unit) 170, a second color correction processing unit 172, and a second image forming unit 174.

The first color correction LUT storage unit 160 stores a plurality of color correction LUTs generated in response to the designated dimming rate in the color correction value calculation unit 110. The first color correction LUT storage unit 160 selects a color correction LUT corresponding to the designated dimming rate δ designated from the dimming rate calculation unit 120 from among a plurality of color correction LUTs. The first color correction processing unit 162 performs the color correction process on an image signal corresponding to the first projector PJ1 using the color correction values of the color correction LUT selected in the first color correction LUT storage unit 160. The color correction LUT prepares correction values corresponding to the correction amount (ΔKRij, ΔKGij, ΔKBij) of a gradation value Kij (for example, gray gradation value) at a pixel position (i, j) in an image for every pixel position and every gradation value. The pixel values (Rij', Gij', Bij') of an image signal after correction in the first color correction processing unit 162 relative to the pixel values (Rij, Gij, Bij) at the pixel position (i, j) of the input image signal are as follows.

$$Rij' = Rij + \Delta KRij \tag{1}$$

$$Gij' = Gij + \Delta KGij \tag{2}$$

$$Bij' = Bij + \Delta KBij \tag{3}$$

As described above, the first color correction processing unit 162 performs the color correction process on the basis of the input image signal from the image signal supply device 200 with reference to the color correction LUT in accordance with the in-plane position and gradation of the image. At this time, the first color correction processing unit 162 performs the color correction process while interpolating between the lattice points of the color correction LUT by known linear interpolation or the like. The image signal subjected to the color correction process corresponding to the first projector PJ1 in the first color correction processing unit 162 is output to the first image forming unit 164. The first image forming unit 164 modulates the color components of light from the light source, which is dimmed on the basis of the dimming control signal from the dimming control unit 140, using the optical modulator on the basis of the image signal subjected to the color correction process in the first color correction processing unit 162, and projects light on the screen SCR through the projection lens.

In the second projector PJ2, similarly to the first projector PJ1, the second color correction LUT storage unit 170 stores the color correction LUT, and the second color correction processing unit 172 performs the color correction process on the input image signal. The second image forming unit 174 modulates the color components of light from the light source, which is dimmed on the basis of the dimming control signal from the dimming control unit 140, using the optical modulator on the basis of the image signal subjected to the color correction process in the second color correction processing unit 172, and projects light on the screen SCR through the projection lens.

Figure 4:
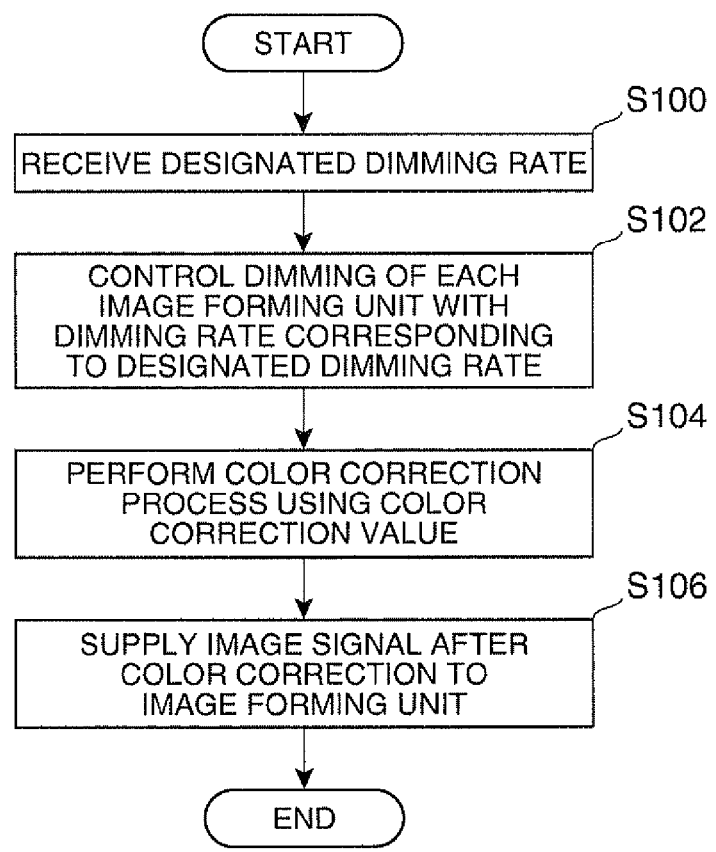
FIG. 4 is a flowchart of an example of an image process in the image display system of the first embodiment.

FIG. 4 is a flowchart of an example of an image process in the image display system 10 of the first embodiment. Although the image process shown in FIG. 4 is performed in the image processor 100, the first projector PJ1, and the second projector PJ2, the overall process may be performed in the image processor 100.

First, the image processor 100 receives the operation information from the operating unit 210 or the sensor information of the sensor 400 to receive the designated dimming rate (Step S100). The image processor 100 may perform a process for determining the designated dimming rate on the basis of the operation information from the operating unit 210 or the sensor information from the sensor 400.

Next, the dimming control unit 140 controls the dimming of the image forming units with the dimming rates set in the image forming units (projectors) in response to the designated dimming rate received in Step S100 with reference to the dimming rate storage unit 130 (Step S102). That is, in Step S102, as a dimming control step, the dimming control unit 140 controls the dimming of the first image forming unit and the second image forming unit on the basis of the dimming rates set in the first image forming unit and the second image forming unit in response to the designated dimming rate.

Each projector includes the color correction LUT storage unit, and performs the color correction process on the image signal corresponding to the projector using the color correction value corresponding to the dimming rate of the corresponding image forming unit in Step S102 (Step S104). That is, in Step S104, as a color correction process step, the color correction process is performed on the image signals corresponding to the first image forming unit and the second image forming unit using the color correction value corresponding to the dimming rates of the first image forming unit and the second image forming unit. Steps S102 and S104 may be reversed. In each projector, the image signal subjected to the color correction process in Step S104 is supplied to the corresponding image forming unit (Step S106), and a sequence of processes ends (end).

In this way, through the cooperation with the color correction process which realizes display of a stack image with a target chromaticity, it is possible to adjust the luminance of the light source of each projector with a dimming rate different from the designated dimming rate. As a result, it is possible to increase the light use efficiency without wastefully decreasing the luminance of the light source.

Comparative Example

Brightness after unevenness correction and dimming on a stack image displayed by the first projector PJ1 and the second projector PJ2 is considered.

Figure 28A:
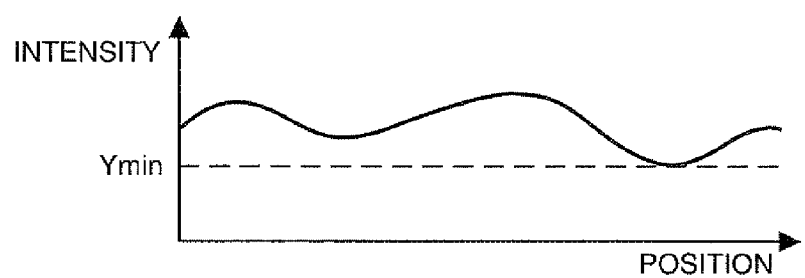
FIG. 28A is a diagram showing an example of a change in luminance in a horizontal direction of a screen.
Figure 28B:
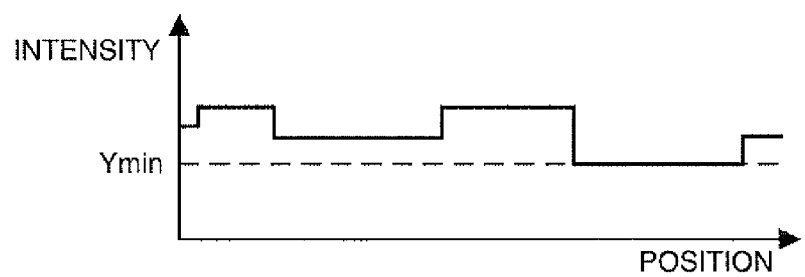
FIG. 28B is a diagram schematically showing the change in luminance of FIG. 28A in a stepwise manner.
Figure 29:
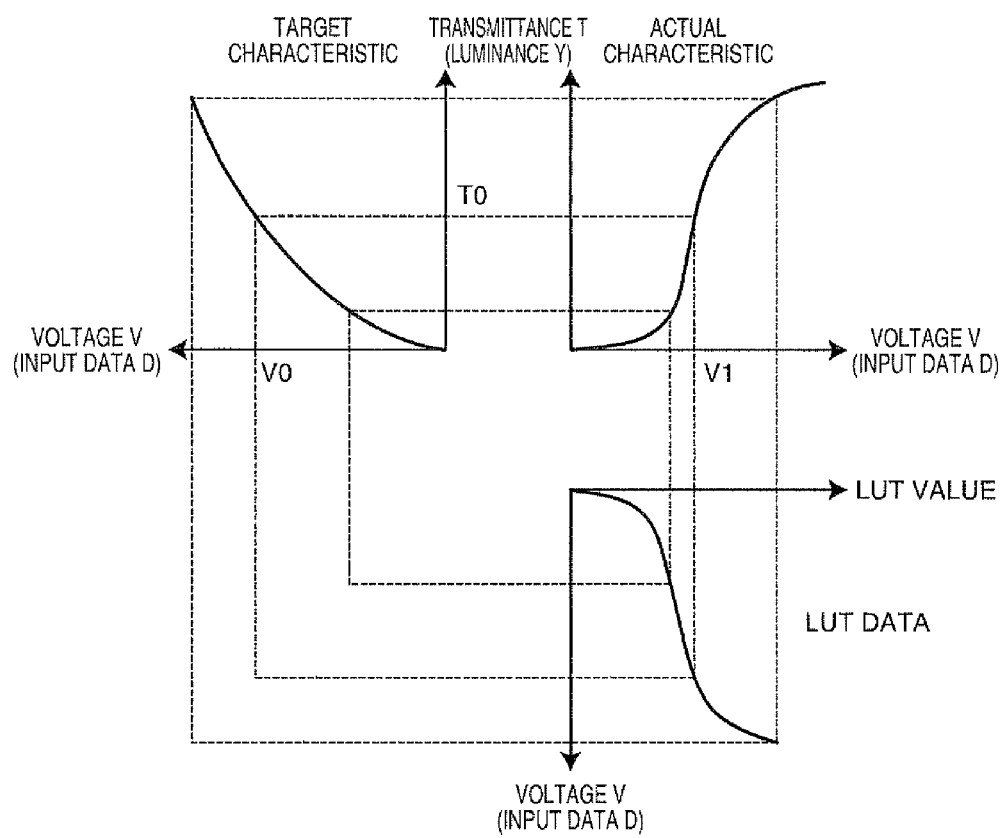
FIG. 29 is an explanatory view of a general color correction principle.

FIGS. 5A to 5F show the state of brightness when dimming is performed after the images of the respective projectors subjected to unevenness correction are stacked. FIGS. 5A to 5F schematically show a change in luminance in the horizontal direction of the screen in a stepwise manner as in FIG. 28B. In FIGS. 5A to 5F, the horizontal axis represents the pixel position of the screen and the vertical axis represents luminance (in a broad sense, intensity).

Figure 5A:
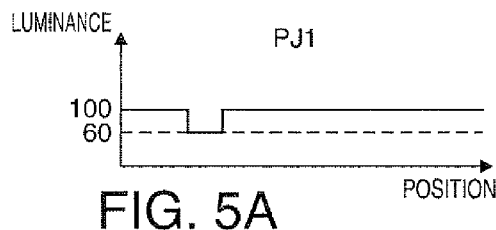
FIGS. 5A to 5F are diagrams showing the state of brightness when dimming is performed after images of respective projectors subjected to unevenness correction are stacked.
Figure 5B:
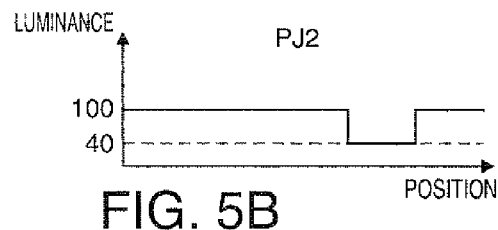
Figure 5C:
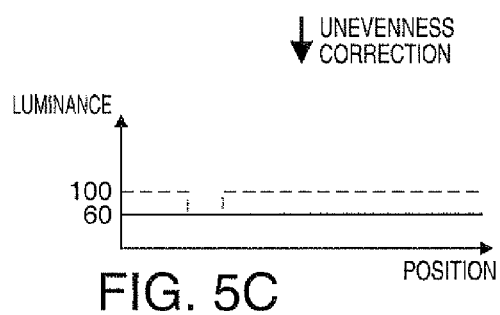
Figure 5D:
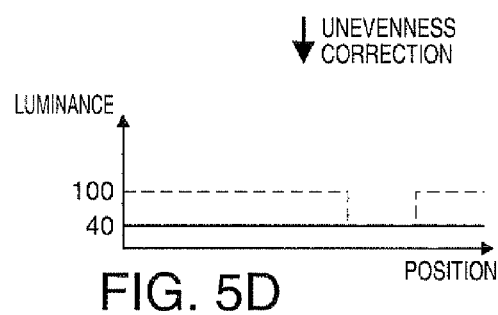
Figure 5E:
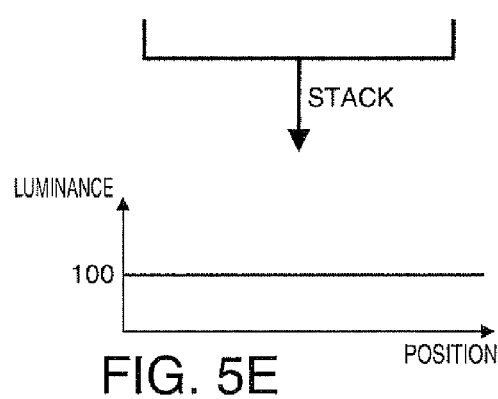
Figure 5F:
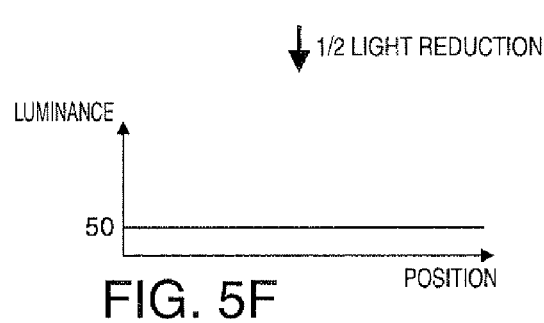

As shown in FIGS. 5A and 5B, the first projector PJ1 and the second projector PJ2 have unevenness, and it is assumed that the minimum value of the luminance of the first projector PJ1 is 60 and the minimum value of the luminance of the second projector PJ2 is 40. At this time, with regard to the first projector PJ1, unevenness correction is performed in accordance with the minimum value 60 of the luminance, and the luminance after unevenness correction is as shown in FIG. 5C. Similarly, with regard to the second projector PJ2, unevenness correction is performed in accordance with the minimum value 40 of the luminance, and the luminance after unevenness correction is as shown in FIG. 5D. If a stack image is displayed using an image of the first projector PJ1 and an image of the second projector PJ2 after unevenness correction, as shown in FIG. 5E, the luminance of both projectors is totaled, and a bright stack image with luminance of 100 is displayed. In this state, if the light sources of both projectors are reduced to 50%, as shown in FIG. 5F, a stack image with luminance of 50 is displayed.

Meanwhile, as described in JP-A-2005-352171, a case where unevenness correction is performed after a stack image is displayed, and dimming is performed is considered.

FIGS. 6A to 6E show the state of brightness when dimming is performed after unevenness correction is performed on a stack image. FIGS. 6A to 6E schematically show a change in luminance in the horizontal direction of the screen in a stepwise manner as in FIG. 28B. In FIGS. 6A to 6E, the horizontal axis represents the pixel position of the screen and the vertical axis represents luminance.

Figure 6A:
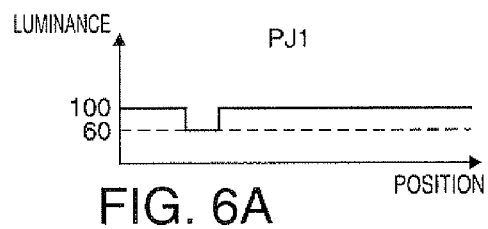
FIGS. 6A to 6E are diagrams showing the state of brightness when dimming is performed after unevenness correction is performed on a stack image.
Figure 6B:
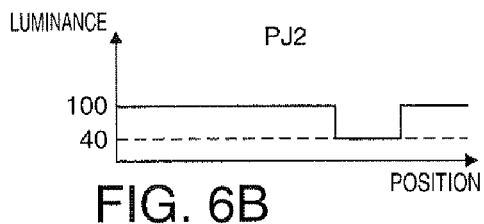
Figure 6C:
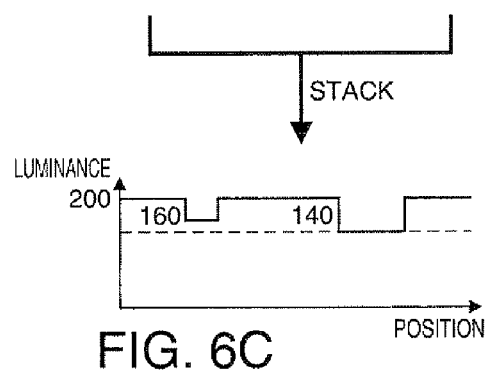
Figure 6D:
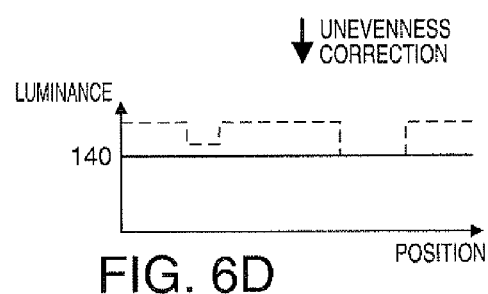

FIG. 6A schematically shows a change in luminance of an image of the first projector PJ1 which is the same as in FIG. 5A. FIG. 6B schematically shows a change in luminance of an image of the second projector PJ2 which is the same as in FIG. 5B. As shown in FIG. 6C, a stack image using the image of FIG. 6A and the image of FIG. 6B has unevenness in which the minimum value of the luminance is 140 (=100+40). At this time, unevenness correction is performed on the stack image in accordance with the minimum value 140 of the luminance, and after unevenness correction, the result is shown in FIG. 6D. In this state, if the light sources of both projectors are reduced to 50%, as shown in FIG. 6E, a stack image with luminance of 70 is displayed.

Figure 6E:
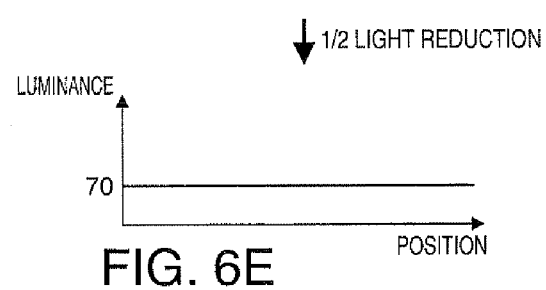

When comparing the image of FIG. 5F with the image of FIG. 6E, the image of FIG. 6E is a brighter image. However, the image of FIG. 6E is obtained by reducing the image of FIG. 6D, and the efficiency when dimming is performed is not optimum.

Next, brightness when dimming is performed after color correction is performed on a stack image displayed by the first projector PJ1 and the second projector PJ2 is considered.

If a target characteristic is set in sRGB (a gradation characteristic in which white point chromaticity is D65 and gamma is 2.2) or the like, the target balance of X, Y, and Z is uniquely set. If the balance of X, Y, and Z in the intrinsic characteristic of the projector is different from the balance of X, Y, and Z in sRGB, the balance is achieved based on the relatively smallest component. For this reason, while wasteful light use efficiency occurs, when dimming is performed after color correction is performed on a stack image, there is the possibility of improvement.

FIGS. 7A to 7F show the state of brightness when dimming is performed after the images of the projectors subjected to color correction are stacked. In FIGS. 7A to 7F, the horizontal axis represents an input voltage and the vertical axis represents XYZ values.

It is assumed that the first projector PJ1 has a characteristic with the balance of X, Y, and Z shown in FIG. 7A and the second projector PJ2 has a characteristic with the balance of X, Y, and Z shown in FIG. 7B. As shown in FIG. 7A, with regard to the first projector PJ1, since X is too small, the brightness after color correction is degraded accordingly (FIG. 7C). Similarly, as shown in FIG. 7B, with regard to the second projector PJ2, since Y is too small, brightness after color correction is degraded accordingly (FIG. 7D). For this reason, if the images from the first projector PJ1 and the second projector PJ2 after color correction are stacked (FIG. 7E) and dimmed to 50%, as shown in FIG. 7F, a dark image is obtained.

Meanwhile, as described in JP-A-2005-352171, a case where color correction is performed after a stack image is displayed, and dimming is performed is considered.

FIGS. 8A to 8E show the state of brightness when dimming is performed after color correction is performed on a stack image. In FIGS. 8A to 8E, the horizontal axis represents an input voltage and the vertical axis represents XYZ values.

It is assumed that the first projector PJ1 has a characteristic with the balance of X, Y, and Z shown in FIG. 8A, and the second projector PJ2 has a characteristic with the balance of X, Y, and Z shown in FIG. 8B. A stack image using the image of FIG. 8A and the image of FIG. 8S becomes a bright image shown in FIG. 8C. Meanwhile, if color correction is performed, an image after color correction is as shown in FIG. 8D. In this state, if the light sources of both projectors are reduced to 50%, as shown in FIG. 8E, a stack image is displayed.

When comparing the image of FIG. 7F with the image of FIG. 8E, the balance of X, Y, and Z before color correction is improved and reaches a proportion close to a target balance, thereby reducing degradation in brightness due to color correction. Thus, the image of FIG. 8E becomes a bright image. From this point, it is understood that, for example, even when focusing on LUT data which is used for color correction in each projector, while the light use efficiency is not sufficient, the light use efficiency in the image of FIG. 8E increases slightly.

Figure 9A:
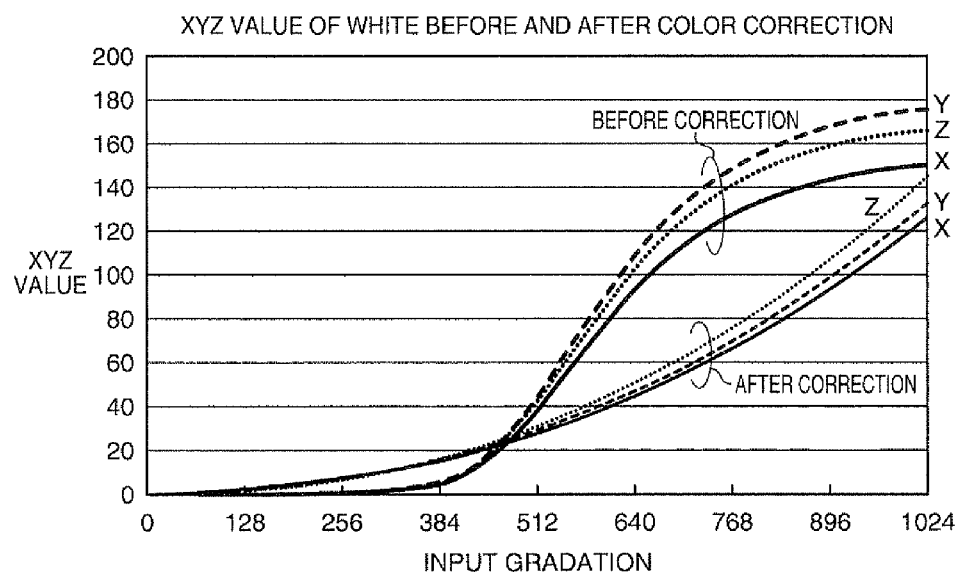
FIG. 9A is a diagram showing an example of XYZ values of white before and after color correction relative to an input gradation in a first projector.
Figure 9B:
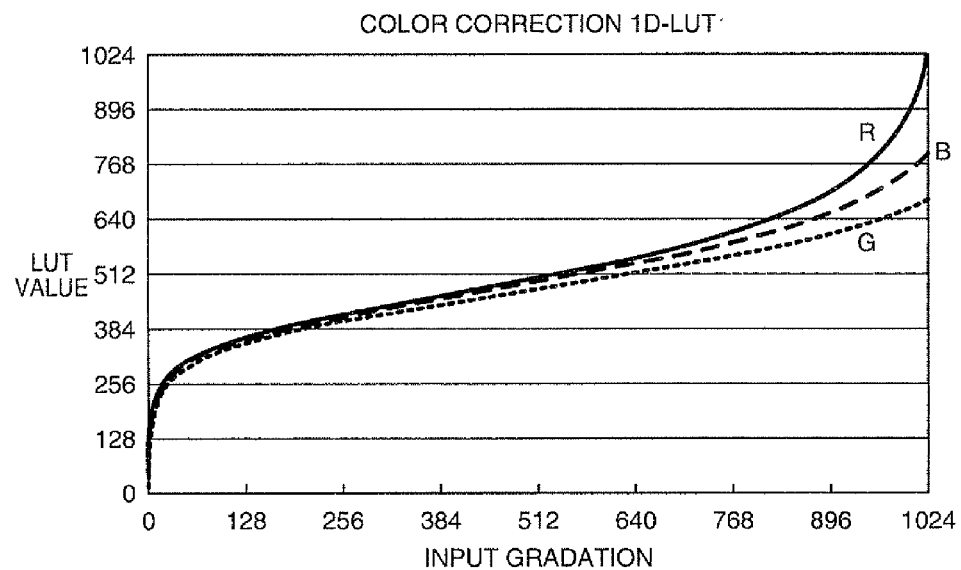
FIG. 9B is a diagram showing an example of LUT data which is used for color correction in the first projector.

FIG. 9A shows an example of XYZ values of white before and after color correction relative to an input gradation in the first projector PJ1. FIG. 9B shows an example of LUT data which is used for color correction in the first projector PJ1. The result of color correction using the LUT data of FIG. 9B is as shown in FIG. 7C.

Figure 10A:
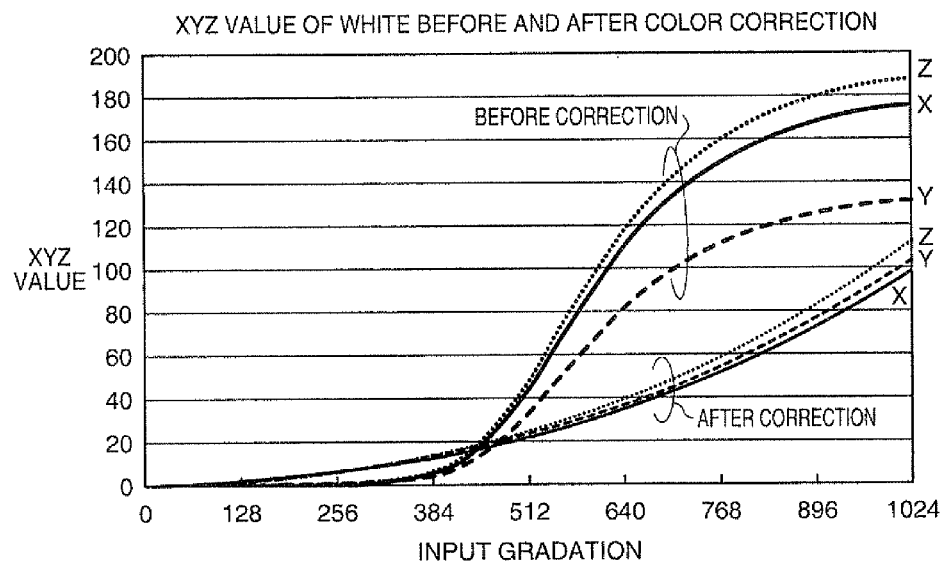
FIG. 10A is a diagram showing an example of XYZ values of white before and after color correction relative to an input gradation in a second projector.
Figure 10B:
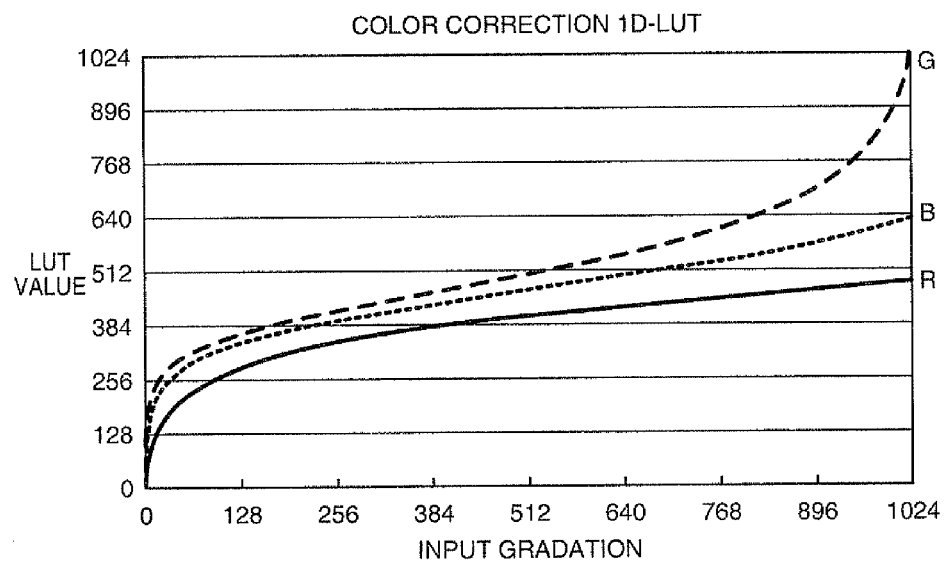
FIG. 10B is a diagram showing an example of LUT data which is used for color correction in the second projector.

FIG. 10A shows an example of XYZ values of white before and after color correction relative to an input gradation in the second projector PJ2. FIG. 10B shows an example of LUT data which is used for color correction in the second projector PJ2. The result of color correction using the LUT data of FIG. 10B is as shown in FIG. 7D.

Figure 11A:
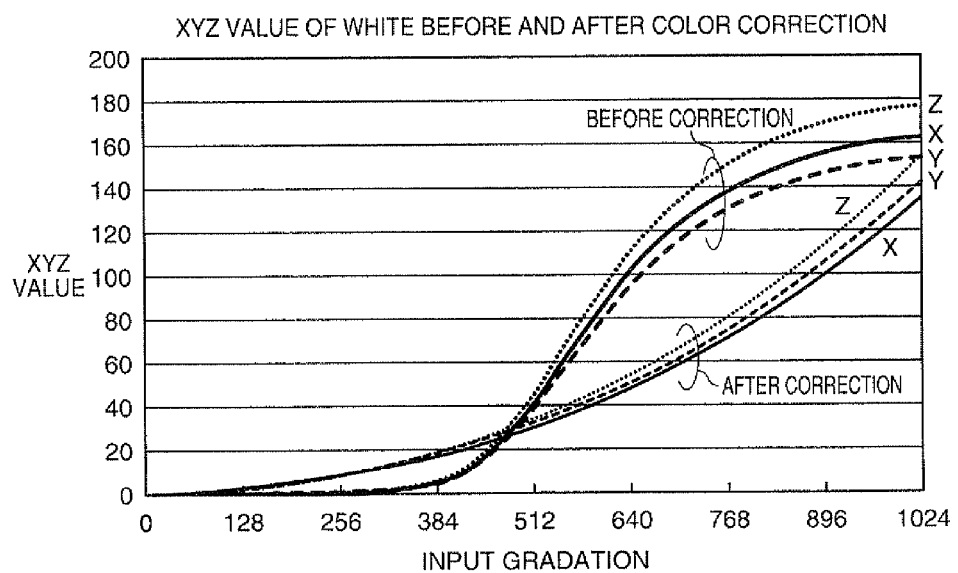
FIG. 11A is a diagram showing an example of XYZ values of white before and after color correction relative to an input gradation when color correction is performed on a stack image.
Figure 11B:
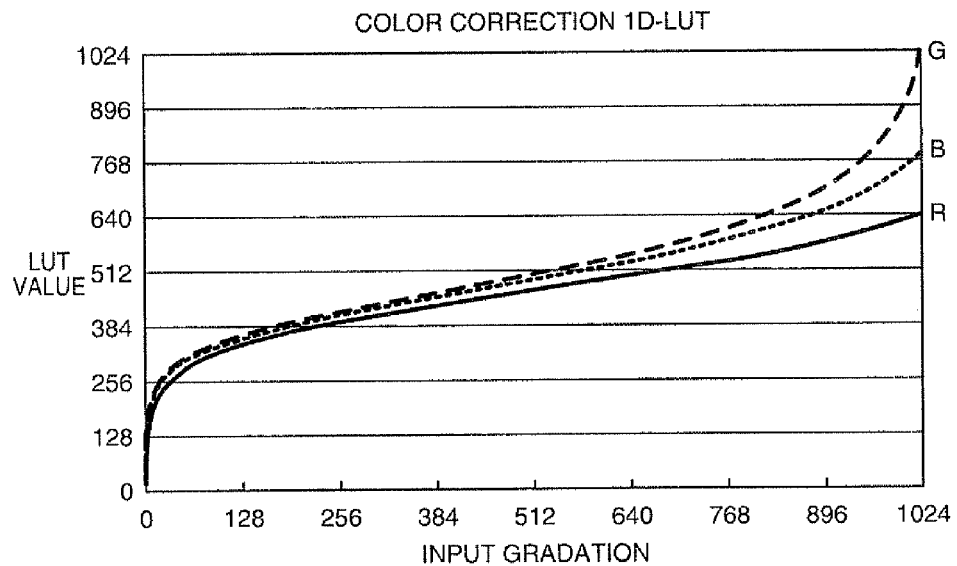
FIG. 11B is a diagram showing an example of LUT data which is used for color correction on a stack image.

FIG. 11A shows an example of XYZ values of white before and after color correction relative to an input gradation when color correction is performed on a stack image. FIG. 11B shows an example of LUT data which is used for color correction on a stack image. The result of color correction using the LUT data of FIG. 11B is as shown in FIG. 8D. FIG. 11A shows an example of XYZ values of white before and after color correction in a state of being reduced to 50%.

As shown in FIG. 9B, in the first projector PJ1, since R from among RGB is especially dark, with regard to R, color correction is performed using the substantially entire range of LUT data prepared in advance compared to GB. As shown in FIG. 10B, in the second projector PJ2, since G from among RGB is especially dark, with regard to G, color correction is performed using the substantially entire range of LUT data prepared in advance compared to RB. When comparing FIG. 9B and FIG. 10B, the second projector PJ2 displays an image with available capacity for RB compared to the first projector PJ1. Meanwhile, as shown in FIG. 11B, in the stack image, the use efficiency of LUT data of R is slightly improved compared to FIG. 10B. Accordingly, it is thought that the image of FIG. 8E has light use efficiency higher than the image of FIG. 7F.

However, in the case of color correction, similarly to unevenness correction, the image of FIG. 8E is obtained by simply reducing the image of FIG. 8D, and the efficiency when dimming is performed is not optimum. For this reason, according to the technique described in JP-A-2005-352171, an image which is reduced through just dimming is obtained, and a stack image may not be displayed with the optimum light use efficiency when dimming is performed. That is, according to the technique described in JP-A-2005-352171, it is difficult to increase the light use efficiency by displaying an image as brightly as possible with the same power consumption or displaying an image with the same brightness with as low power consumption as possible. Accordingly, in the first embodiment, through the cooperation with the color correction process which realizes display of a stack image with a target chromaticity, it is possible to adjust the luminance of the light source of each projector with a dimming rate different from the designated dimming rate, thereby increasing the light use efficiency without wastefully decreasing the luminance of the light source.

Process Example

Hereinafter, a process example of the image processor 100 will be specifically described.

Figure 12:
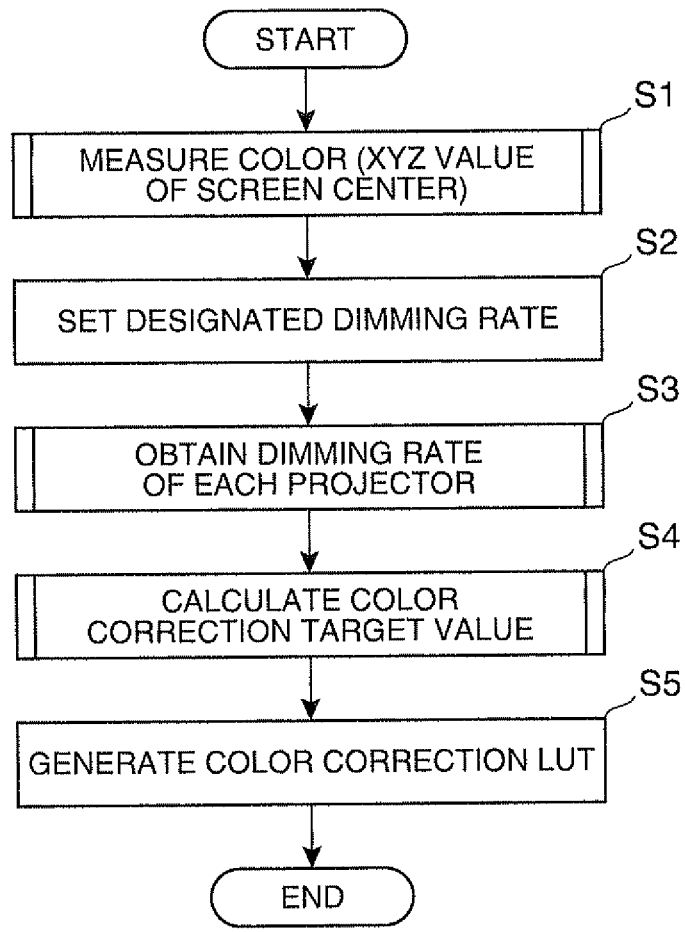
FIG. 12 is a flowchart of a process example of an image processor.

FIG. 12 is a flowchart of a process example of the image processor 100.

Figure 13:
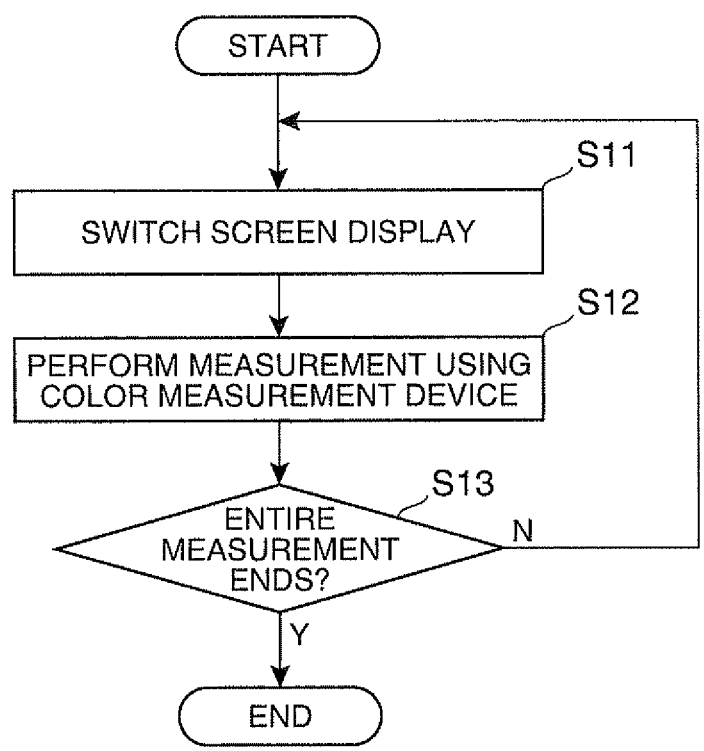
FIG. 13 is a flowchart showing a process example of a color measurement process in Step S1 of FIG. 12.

FIG. 13 is a flowchart of a process example of a color measurement process in Step S1 of FIG. 12.

When the image processor 100 realizes the process of FIG. 12 or 13 through a software process, a program which realizes the following process is stored in the memory which is embedded in the image processor 100, and the CPU which reads the program performs a process corresponding to the program.

First, the image processor 100 controls the color measurement device 300 and acquires the XYZ values of the screen center, which is the measurement result of the color measurement device 300, as the color measurement values of the projectors (Step S1).

In Step S1, first, each projector projects one of the solid images of the entire screen of the respective gradations of RGB colors on the screen SCR (Step S11). In this state, the image processor 100 performs control for measuring the XYZ values of the screen center using the color measurement device 300 and acquires the XYZ values as the measurement result (Step S12). Thereafter, when the entire measurement does not end (Step S13: N), the image processor 100 returns to Step S11 and projects the next solid image on the screen SCR. In this way, if the color measurement values are acquired for all the solid images of the entire screen of the respective gradations of the RGB colors (Step S13: Y), the image processor 100 ends the processing of Step S1 (end).

Subsequently, the image processor 100 obtains the target light source luminance from the operation information from the operating unit 210 or the sensor information from the sensor 400 in the designated dimming rate generation unit 122, and sets the designated dimming rate δ corresponding to the target light source luminance (Step S2).

The image processor 100 calculates the light source luminance of the projectors from the XYZ values of white and the target light source luminance (=designated dimming rate δ) in the light source luminance calculation unit 124, and obtains the dimming rates α and β corresponding to the light source luminance (Step S3). That is, in Step S3, as a light source luminance calculation step, the light source luminance calculation unit 124 calculates the dimming rates α and β of the first image forming unit and the second image forming unit on the basis of the designated dimming rate δ and the color characteristic values of the first image and the second image.

Next, the image processor 100 calculates the color correction target value in a stack state for each gradation from the light source luminance of each projector and the color measurement value of each gradation of each projector acquired in Step S1 in the color correction target value calculation unit 112 (Step S4). That is, in Step S4, as a color correction target value calculation step, the color correction target value calculation unit 112 calculates the color correction target value corresponding to the first image forming unit and the second image forming unit on the basis of a value obtained by totaling the color characteristic values of the first image and the second image in accordance with the dimming rates of the first image forming unit and the second image forming unit.

Thereafter, the image processor 100 generates the color correction LUT on the basis of the color correction target value in the color correction LUT generation unit 114 (Step S5). That is, in Step S5, as a color correction value generation step, the color correction LUT generation unit 114 generates the color correction value corresponding to the image forming units on the basis of the color correction target value calculated in Step S4.

The color correction LUT generated in Step S5 is stored to the color correction LUT storage unit of each projector. Subsequently, the image processor 100 performs dimming control of the projectors with the dimming rates calculated in Step S3, and the projectors perform the color correction process with reference to the color correction LUT generated in Step S5.

Next, the light source luminance calculation process in Step S3 and color correction target value calculation process in Step S4 of FIG. 12 will be specifically described.

Light Source Luminance Calculation Process

It is assumed that the XYZ values of the RGB primary colors of the first projector PJ1 are $(X_R1, Y_R1, Z_R1)$, $(X_G1, Y_G1, Z_G1)$ and $(X_B1, Y_B1, Z_B1)$. Similarly, the XYZ values of the RGB primary colors of the second projector PJ2 are $(X_R2, Y_R2, Z_R2)$, $(X_G2, Y_G2, Z_G2)$, and $(X_B2, Y_B2, Z_B2)$. In general, the XYZ values when the RGB primary colors are input to the first projector PJ1 and the second projector PJ2 are expressed by Expression (4).

$$\begin{bmatrix} X \\ Y \\ Z \end{bmatrix} = \begin{bmatrix} X_R1 + X_R2 & X_G1 + X_G2 & X_B1 + X_B2 \\ Y_R1 + Y_R2 & Y_G1 + Y_G2 & Y_B1 + Y_B2 \\ Z_R1 + Z_R2 & Z_G1 + Z_G2 & Z_B1 + Z_B2 \end{bmatrix} \begin{bmatrix} R \\ G \\ B \end{bmatrix} \quad (4)$$

The above expression corresponds to the XYZ values of a solid image of white in a stack state. Accordingly, when the target XYZ values of sRGB or the like are Xt, Yt, and Zt, $Yt = Y_R1 + Y_R2 + Y_G1 + Y_G2 + Y_B1 + Y_B2$ is set using the above expression, and Xt and Zt in sRGB are obtained on the basis of the chromaticity of sRGB and Yt. If a target dimming rate is δ (0≤δ≤1), the XYZ values (Xc, Yc, Zc) after color correction and dimming are expressed by Expressions (5-1) to (5-3). In the following expressions, one of Rc, Gc, and Bc becomes equal to 1. Since a color component which becomes equal to 1 has weak luminance, it is necessary that the corresponding color component is emitted fully so as to match the color to target white. When a color component which does not become equal to 1 has strong luminance, it should suffice that the corresponding color component is emitted weakly.

$$\begin{bmatrix} R_t \\ G_t \\ B_t \end{bmatrix} = \begin{bmatrix} X_R1 + X_R2 & X_G1 + X_G2 & X_B1 + X_B2 \\ Y_R1 + Y_R2 & Y_G1 + Y_G2 & Y_B1 + Y_B2 \\ Z_R1 + Z_R2 & Z_G1 + Z_G2 & Z_B1 + Z_B2 \end{bmatrix}^{-1} \begin{bmatrix} X_t \\ Y_t \\ Z_t \end{bmatrix} \quad (5\text{-}1)$$

$$R_c = R_t \times \min(1/R_t, 1/G_t, 1/B_t) \quad (5\text{-}2)$$
$$G_c = G_t \times \min(1/R_t, 1/G_t, 1/B_t)$$
$$B_c = B_t \times \min(1/R_t, 1/G_t, 1/B_t)$$

$$\begin{bmatrix} X_c \\ Y_c \\ Z_c \end{bmatrix} = \delta \times \begin{bmatrix} X_R1 + X_R2 & X_G1 + X_G2 & X_B1 + X_B2 \\ Y_R1 + Y_R2 & Y_G1 + Y_G2 & Y_B1 + Y_B2 \\ Z_R1 + Z_R2 & Z_G1 + Z_G2 & Z_B1 + Z_B2 \end{bmatrix} \begin{bmatrix} R_c \\ G_c \\ B_c \end{bmatrix} \quad (5\text{-}3)$$

Meanwhile, in the first embodiment, the dimming rates are determined in cooperation with color correction, thereby making the dimming rates of the projectors different from each other. If the dimming rate of the first projector PJ1 is α (0≤α≤1) and the dimming rate of the second projector PJ2 is β (0≤β≤1), the light source luminance calculation unit 124 obtains the XYZ values (Xp, Yp, Zp) after color correction and dimming in accordance with Expressions (6-1) to (6-3).

$$\begin{bmatrix} R_t \\ G_t \\ B_t \end{bmatrix} = \begin{bmatrix} \alpha X_R1 + \beta X_R2 & \alpha X_G1 + \beta X_G2 & \alpha X_B1 + \beta X_B2 \\ \alpha Y_R1 + \beta Y_R2 & \alpha Y_G1 + \beta Y_G2 & \alpha Y_B1 + \beta Y_B2 \\ \alpha Z_R1 + \beta Z_R2 & \alpha Z_G1 + \beta Z_G2 & \alpha Z_B1 + \beta Z_B2 \end{bmatrix}^{-1} \begin{bmatrix} X_t \\ Y_t \\ Z_t \end{bmatrix} \quad (6\text{-}1)$$

$$R_p = R_t \times \min(1/R_t, 1/G_t, 1/B_t) \quad (6\text{-}2)$$
$$G_p = G_t \times \min(1/R_t, 1/G_t, 1/B_t)$$
$$B_p = B_t \times \min(1/R_t, 1/G_t, 1/B_t)$$

$$\begin{bmatrix} X_p \\ Y_p \\ Z_p \end{bmatrix} = \begin{bmatrix} \alpha X_R1 + \beta X_R2 & \alpha X_G1 + \beta X_G2 & \alpha X_B1 + \beta X_B2 \\ \alpha Y_R1 + \beta Y_R2 & \alpha Y_G1 + \beta Y_G2 & \alpha Y_B1 + \beta Y_B2 \\ \alpha Z_R1 + \beta Z_R2 & \alpha Z_G1 + \beta Z_G2 & \alpha Z_B1 + \beta Z_B2 \end{bmatrix} \begin{bmatrix} R_p \\ G_p \\ B_p \end{bmatrix} \quad (6\text{-}3)$$

In Expressions (6-1) to (6-3), it is assumed that $\delta = (\alpha + \beta)/2$. That is, the dimming rates α and β are obtained such that the designated dimming rate β becomes equal to the average value of the dimming rate α of the first projector PJ1 and the dimming rate β of the second projector PJ2. The light source luminance calculation unit 124 obtains the dimming rates α and β through the following process.

Figure 14:
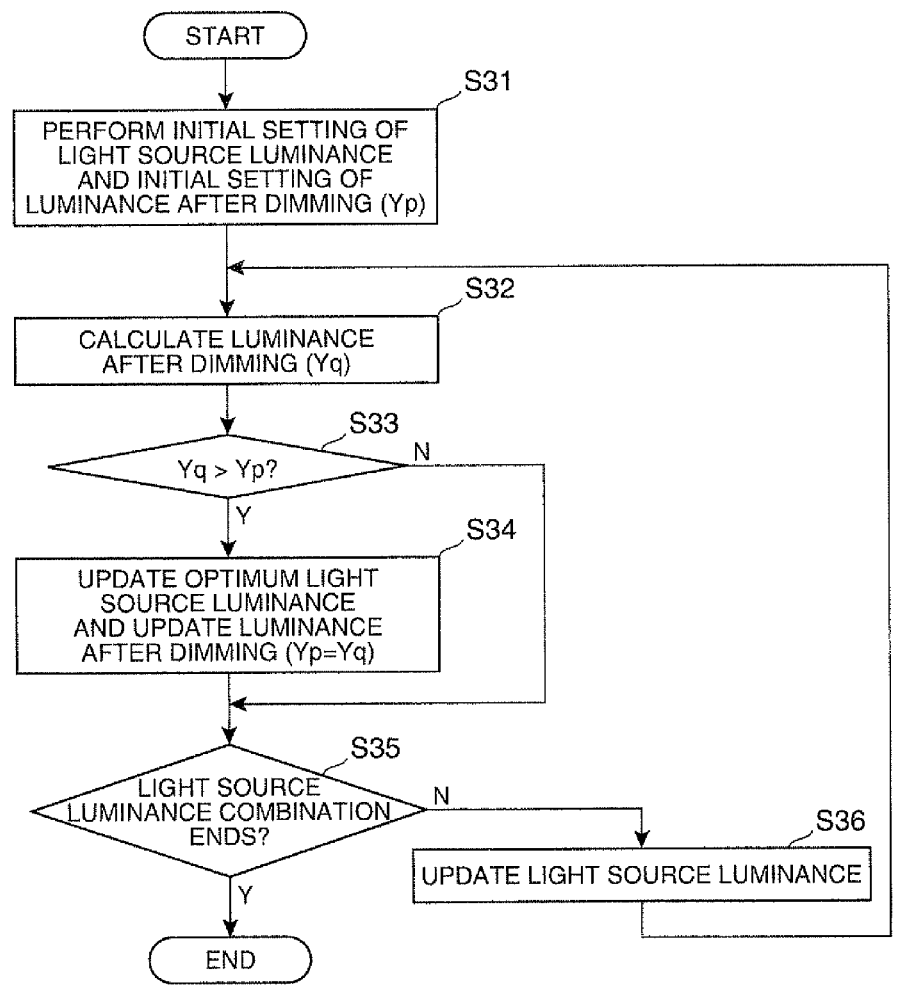
FIG. 14 is a flowchart showing a process example of a light source luminance calculation unit.

FIG. 14 is a flowchart of a process example of the light source luminance calculation unit 124. When the image processor 100 including the light source luminance calculation unit 124 realizes the process of FIG. 14 through a software process, a program which realizes the following process is stored in the memory which is embedded in the image processor 100, and the CPU which reads the program performs a process corresponding to the program. The process of FIG. 14 is performed in Step S3 of FIG. 12.

First, prior to searching the dimming rates α and β, the light source luminance calculation unit 124 performs the initial settings of the dimming rates α and β corresponding to the light source luminance and the luminance Yp after dimming (Step S31). As the initial setting of the light source luminance, while α=β=δ may be set as an initial value, for example, α=0 and β=2δ are set, α is changed in an increasing direction and β is changed in a decreasing direction to simplify a search process. As the initial setting of the luminance Yp after dimming, 0 is set.

Next, the light source luminance calculation unit 124 obtains the value of the right side of Expression (6-3) using the dimming rates $\alpha$ and $\beta$ and sets the value to a variable Yq (Step S32).

Subsequently, the light source luminance calculation unit 124 compares Yp with Yq obtained in Step S32 (Step S33). When Yq is greater than Yp (Step S33: Y), the light source luminance calculation unit 124 updates the dimming rates $\alpha$ and $\beta$ corresponding to Yq as the optimum light source luminance and substitutes Yq into the luminance Yp after dimming (Step S34).

When all the combinations of the light source luminance do not end (Step S35: N), the dimming rates $\alpha$ and $\beta$ are updated (Step S36), and the process returns to Step S32. Step S36 is not limited to a step of changing the dimming rates, and it is desirable to set the dimming rates taking into consideration the processing time or the like. In Step S36, for example, the dimming rates are changed to $(\alpha, \beta)=(0, 1)$, $(\alpha, \beta)=(0.05, 0.95)$, $(\alpha, \beta)=(0.10, 0.90)$, ..., $(\alpha, \beta)=(0.95, 0.05)$, and $(\alpha, \beta)=(1, 0)$.

In Step S35, when all the combinations of the light source luminance end (Step S35: Y), the light source luminance calculation unit 124 ends a sequence of processes (end), and determines the dimming rates $\alpha$ and $\beta$ at that time as the light source luminance of the projectors.

Figure 15:
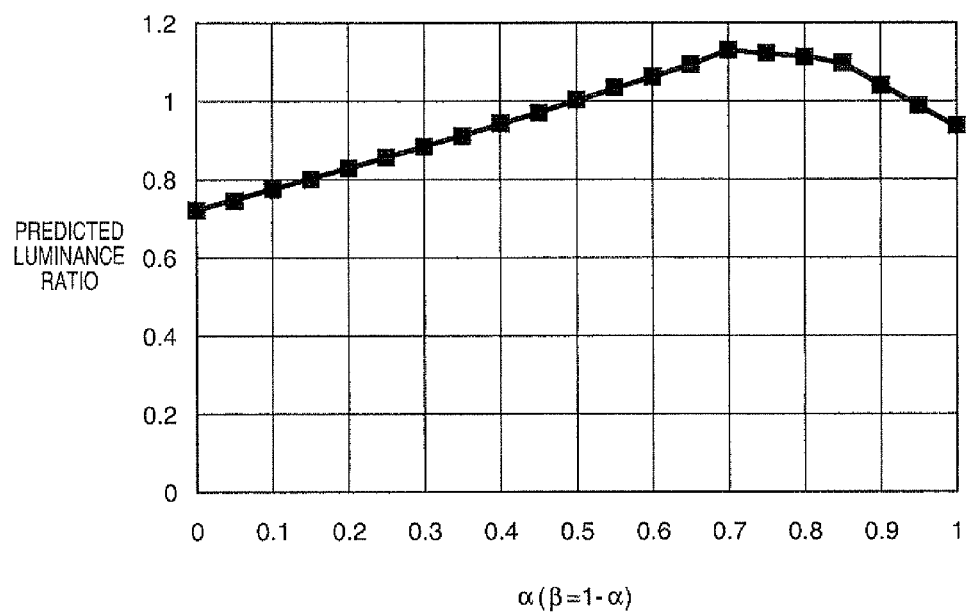
FIG. 15 is a diagram showing a calculation example of a dimming rate in a light source luminance calculation unit.

FIG. 15 shows a calculation example of the dimming rates $\alpha$ and $\beta$ in the light source luminance calculation unit 124. FIG. 15 shows a predicted luminance ratio during uneven dimming relative to luminance during even dimming ($\alpha=\beta=0.5$) when the color characteristic of the first projector PJ1 is as shown in FIG. 9A and the color characteristic of the second projector PJ2 is as shown in FIG. 10A. In FIG. 15, the horizontal axis represents $\alpha$ and the vertical axis represents a predicted luminance ratio.

FIG. 15 shows a case where the dimming rates $\alpha$ and $\beta$ are different from each other based on even dimming, thereby further increasing the luminance after color correction and dimming. In this case, when the dimming rates $\alpha=0.7$ and $\beta=0.3$, the predicted luminance ratio is maximal.

FIGS. 16A to 16H show the state of brightness when color correction and dimming are performed under the condition of the dimming rates $\alpha=0.7$ and $\beta=0.3$ according to the first embodiment. In FIGS. 16A to 16H, the horizontal axis represents an input voltage and the vertical axis represents an XYZ value.

It is assumed that the first projector PJ1 has a characteristic with the balance of X, Y, and Z shown in FIG. 16A, and the second projector PJ2 has a characteristic with the balance of X, Y, and Z shown in FIG. 16B. If color correction is performed, a stack image using the image of FIG. 16A and the image of FIG. 16B is as shown in FIG. 16C. In this state, if the light sources of both projectors are reduced to 50%, as shown in FIG. 16D, a stack image is displayed.

Meanwhile, if the image shown in FIG. 16A is reduced to 70% with the dimming rate $\alpha=0.7$, an image shown in FIG. 16E is obtained. If the image shown in FIG. 16B is reduced to 30% with the dimming rate $\beta=0.3$, an image shown in FIG. 16F is obtained. A stack image of the image of FIG. 16E and the image of FIG. 16F is as shown in FIG. 16G, and if color correction is performed, an image shown in FIG. 16H is obtained. When comparing the image of FIG. 16D with the image of FIG. 16H, in the image of FIG. 16H, the XYZ values after correction are further increased, thereby suppressing degradation in luminance after correction.

Figure 17A:
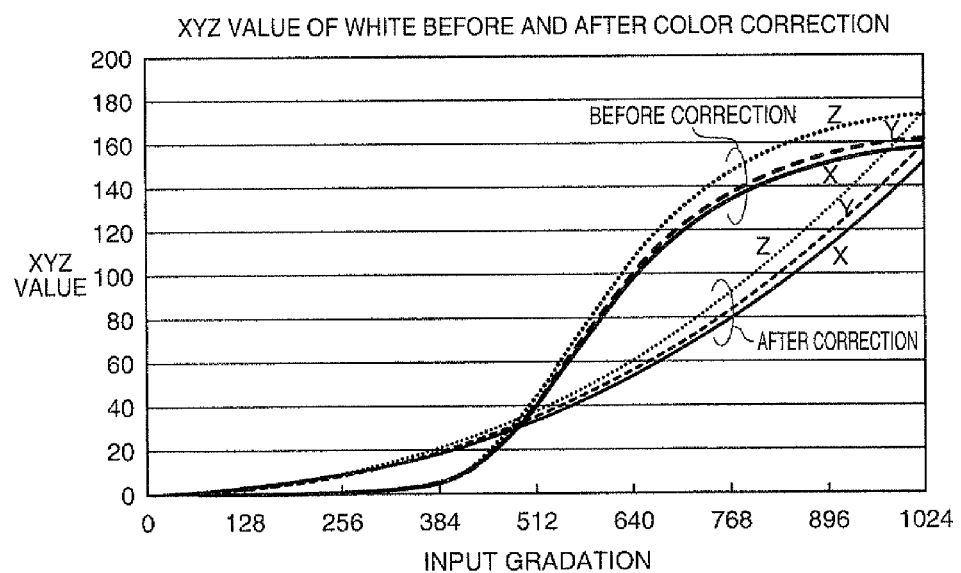
FIG. 17A is a diagram showing an example of XYZ values of white before and after color correction relative to an input gradation when a stack image of gray is displayed under the condition of dimming rates α=0.7 and β=0.3.
Figure 17B:
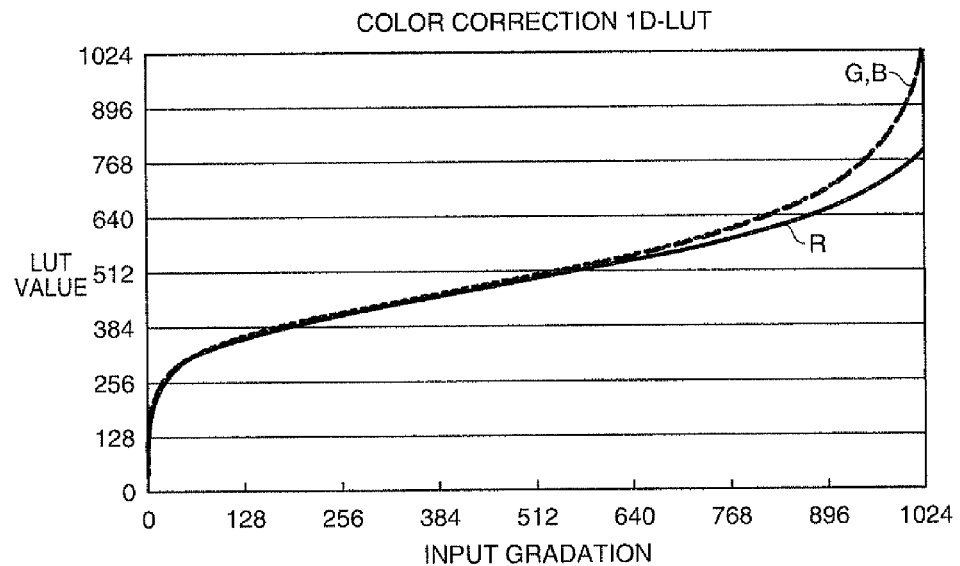
FIG. 17B is a diagram showing an example of LUT data which is used for color correction of FIG. 17A.

FIG. 17A shows an example of XYZ values of white before and after color correction relative to an input gradation when a stack image of gray is displayed under the condition of the dimming rates $\alpha=0.7$ and $\beta=0.3$. FIG. 17B shows an example (LUT data of G and B are superimposed) of LUT data which is used for color correction of FIG. 17A.

When comparing FIG. 17A and FIG. 11A in which color correction is performed on a stack image, FIG. 17A shows that the XYZ values after correction are further increased, thereby suppressing degradation in luminance after correction. In particular, when comparing FIG. 17B and FIG. 11B, LUT data is a value closer to a maximum value 1023, and the light use efficiency is rising. Accordingly, when images from two projectors are superimposed to brighten an image, if it is assumed that power consumption or brightness during projection is simply in proportion to the amount of light of the light source, according to the first embodiment, brightness can be raised with the same power consumption.

Color Correction Target Value Calculation Process

The color correction target value calculation unit 112 calculates the color correction target value in each gradation on the basis of the dimming rate corresponding to the light source luminance calculated by the light source luminance calculation unit 124 and the color measurement value obtained from the color measurement device 300.

Figure 18:
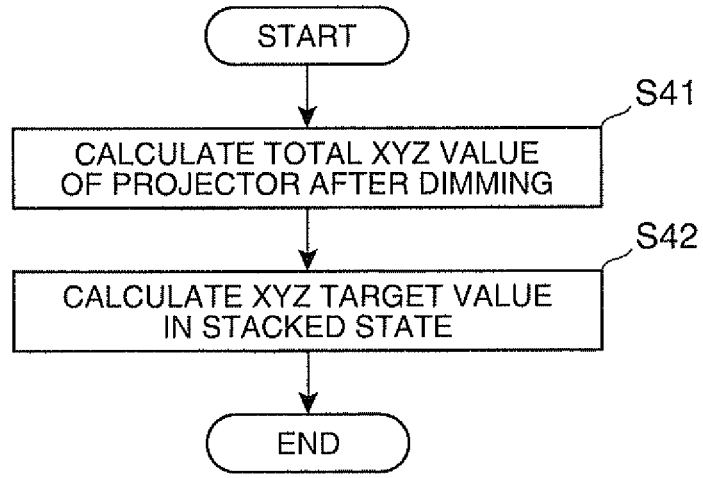
FIG. 18 is a flowchart of an example of a color correction target value calculation process in Step S4 of FIG. 12.

FIG. 18 is a flowchart of an example of a color correction target value calculation process in Step S4 of FIG. 12. When the image processor 100 realizes the process of FIG. 18 through a software process, a program which realizes the following process is stored in the memory which is embedded in the image processor 100, and the CPU which reads the program performs a process corresponding to the program.

In the image processor 100, the color correction target value calculation unit 112 totals the XYZ values of the image of the first projector PJ1 and the XYZ values of the image of the second projector PJ2 for the respective gradations from black to white (Step S41). The color correction target value calculation unit 112 applies the dimming rates calculated in the light source luminance calculation unit 124 to the projectors and then totals the XYZ values described above.

Next, the color correction target value calculation unit 112 calculates the XYZ target values in a stack state (Step S42), and ends a sequence of processes (end). That is, the color correction value corresponds to a value which is obtained by totaling the color characteristic values of the respective images in accordance with the dimming rates of the image forming units. Since white should be corrected in a direction in which brightness is degraded, white matches the darkest color from among RGB. With regard to black, the average value of X, the average value of Y, and the average value of Z when display is performed with (R, G, B)=(0, 0, 0) and the dimming rates $\alpha$ and $\beta$ are applied are used directly. With regard to an intermediate gradation, the color correction target value calculation unit 112 performs correction as follows.

The color correction value which corresponds to the value obtained by totaling the color characteristic values of the images, to which the dimming rates of the projectors (the image forming units) are applied, is used, and color correction is performed while a plurality of image forming units are regarded as a single image forming unit. Accordingly, it should suffice that the color correction value common to the image forming units is generated. For this reason, it is possible to achieve efficient color correction.

Figure 19:
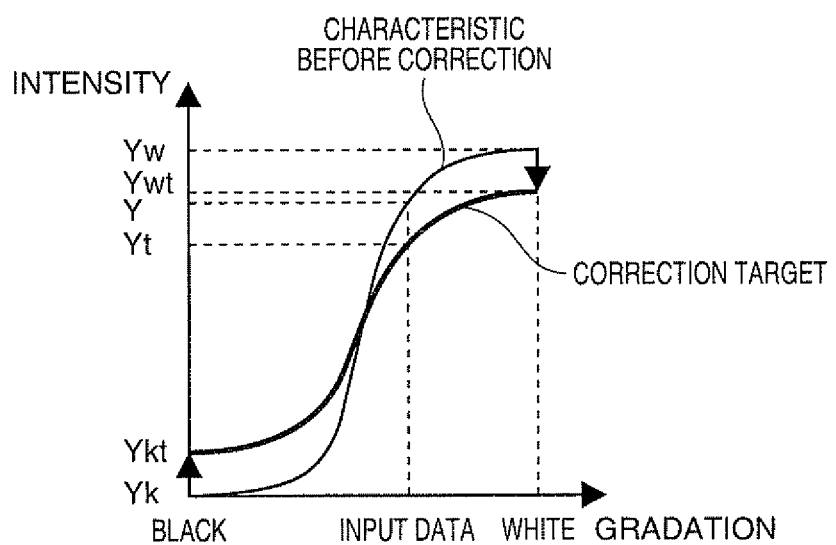
FIG. 19 is an operation explanatory view of a color correction target value calculation unit.

FIG. 19 is an operation explanatory view of the color correction target value calculation unit 112. In FIG. 19, the horizontal axis represents input data corresponding to a gradation and the vertical axis represents luminance.

For example, if the XYZ target values Dw of white and the XYZ target values Dk of black in the stack state are set, the target value Yt of Y from among the XYZ target values of the intermediate gradation Di is obtained by the following expression. In the following expression, the color correction target value of white is Ywt, the color correction target value of black is Ykt, and a gamma value is γ. Although in Expression (7), an example where the target value of Y is obtained is described, X and Z are obtained in a similar manner.

$$Y_t=(Y_{wt}-Y_{kt})\times((D_i-D_k)/(D_w-D_k))^\gamma+Y_{kt} \quad (7)$$

As described above, in the first embodiment, the color correction target value is set while the projectors in the stack state are regarded as a single projector, and the color correction LUT shown in FIG. 17B is generated. The color correction LUT is the color correction LUT common to the first projector PJ1 and the second projector PJ2, and the first projector PJ1 and the second projector PJ2 perform the same color correction. The images are displayed in the stack state using the light sources which are dimmed relative to the image signals subjected to the same color correction in the projectors, thereby displaying the image after color correction shown in FIG. 17A.

According to the first embodiment, it is possible to improve the light use efficiency and to display a brighter image with the same power consumption while realizing image display with a target chromaticity. For example, when the first projector PJ1 has a characteristic shown in FIG. 9A and the second projector PJ2 has a characteristic shown in FIG. 10A, it is assumed that power consumption or brightness during projection is simply in proportion to the amount of light of the light source. Specifically, when power consumption is 50% and just one projector is displayed, the luminance of the first projector PJ1 becomes 132 cd/m², and the luminance of the second projector PJ2 becomes 101 cd/m². At this time, when both projectors are in the stack state, the average luminance becomes 116 cd/m². Meanwhile, in the technique described in JP-A-2005-352171, the average luminance becomes 140 cd/m². According to the first embodiment, the average luminance becomes 158 cd/m².

According to the first embodiment, since color correction is performed while a plurality of projectors are regarded as a single projector, it should suffice that the color correction LUT is generated for one projector, thereby achieving efficient color correction.

First Modification of First Embodiment

In the first embodiment, with regard to target white of sRGB or the like, a transformation matrix M which gives the relationship between RGB and XYZ becomes Expression (8-1), and for example, if the luminance is normalized for white of sRGB, Expression (8-2) can be obtained.

$$\begin{bmatrix} X_t \\ Y_t \\ Z_t \end{bmatrix} = M \begin{bmatrix} R \\ G \\ B \end{bmatrix} = \begin{bmatrix} X_R & X_G & X_B \\ Y_R & Y_g & Y_b \\ Z_R & Z_G & Z_B \end{bmatrix} \begin{bmatrix} R \\ G \\ B \end{bmatrix} \quad (8\text{-}1)$$

$$\begin{bmatrix} 0.9505 \\ 1 \\ 1.089 \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} 1 \\ 1 \\ 1 \end{bmatrix} \quad (8\text{-}2)$$

If (Xt, Yt, Zt)=(0.9505, 1, 1.089) of Expression (8-2), the transformation matrix M, the dimming rate α of the first projector PJ1, and the dimming rate β of the second projector PJ2 are used, the XYZ values (Xp, Yp, Zp) after color correction and dimming are as follows.

$$\begin{bmatrix} R_t \\ G_t \\ B_t \end{bmatrix} = \begin{bmatrix} \alpha X_R 1 + \beta X_R 2 & \alpha X_G 1 + \beta X_G 2 & \alpha X_B 1 + \beta X_B 2 \\ \alpha Y_R 1 + \beta Y_R 2 & \alpha Y_G 1 + \beta Y_G 2 & \alpha Y_B 1 + \beta Y_B 2 \\ \alpha Z_R 1 + \beta Z_R 2 & \alpha Z_G 1 + \beta Z_G 2 & \alpha Z_B 1 + \beta Z_B 2 \end{bmatrix}^{-1} \begin{bmatrix} X_t \\ Y_t \\ Z_t \end{bmatrix} \quad (9\text{-}1)$$

$$R_p = G_p = B_p = Y_p \times \min(1/R_t, 1/G_t, 1/B_t) \quad (9\text{-}2)$$

$$\begin{bmatrix} X_p \\ Y_p \\ Z_p \end{bmatrix} = M \begin{bmatrix} R_p \\ G_p \\ B_p \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_p \\ G_p \\ B_p \end{bmatrix} \quad (9\text{-}3)$$

According to the first modification, with Expressions (9-1) to (9-3), in sRGB, it is possible to improve the light use efficiency and to display a brighter image with the same power consumption while realizing image display with a target chromaticity.

Second Modification of First Embodiment

Although in the first embodiment or the first modification, the optimum dimming rates α and β are obtained in each gradation, in a second modification, the dimming rates α and β which are obtained for white are used. In this case, while Yp does not conform to white luminance which is obtained through color correction, it should suffice that the relative magnitude relationship when the combination of the dimming rates α and β is changed is known. Accordingly, first, the optimum combination of α and β is simply obtained using the set transformation matrix M, the XYZ values (Xw1, Yw1, Zw1, Xw2, Yw2, Zw2) of white of the first projector PJ1 and the second projector PJ2 by Expressions (10-1) to (10-3). Only when detailed color correction is performed, accurate color correction is performed using Expressions (6-1) to (6-3) or Expressions (9-1) to (9-3). In this way, it is not necessary to obtain the XYZ values of the RGB primary colors every time to construct a transformation matrix.

$$X_w = \alpha X_w 1 + \beta X_w 2 \quad (10\text{-}1)$$
$$Y_w = \alpha Y_w 1 + \beta Y_w 2$$
$$Z_w = \alpha Z_w 1 + \beta Z_w 2$$

$$\begin{bmatrix} R_w \\ G_w \\ B_w \end{bmatrix} = M^{-1} \begin{bmatrix} X_w \\ Y_w \\ Z_w \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix}^{-1} \begin{bmatrix} X_w \\ Y_w \\ Z_w \end{bmatrix} \quad (10\text{-}2)$$

$$R_p = G_p = B_p = \min(R_w, G_w, B_w) \quad (10\text{-}3)$$

$$\begin{bmatrix} X_p \\ Y_p \\ Z_p \end{bmatrix} = M \begin{bmatrix} R_p \\ G_p \\ B_p \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_p \\ G_p \\ B_p \end{bmatrix} \quad (10\text{-}4)$$

According to the second modification, it is possible to simplify the calculation of the dimming rates α and β for optimum color correction and dimming, to improve the light use efficiency, and to display a brighter image with the same power consumption while realizing image display with a target chromaticity.

Third Modification

Although in the first embodiment and the first modification or the second modification of the first embodiment, a configuration in which the image processor is externally attached to the two projectors each having the image forming unit has been described, the invention is not limited thereto. For example, the invention may be applied to an image display system which has a plurality of image forming units in a housing, synthesizes image light from the image forming units in the housing, and projects the synthesized image light on the screen SCR.

Figure 20:
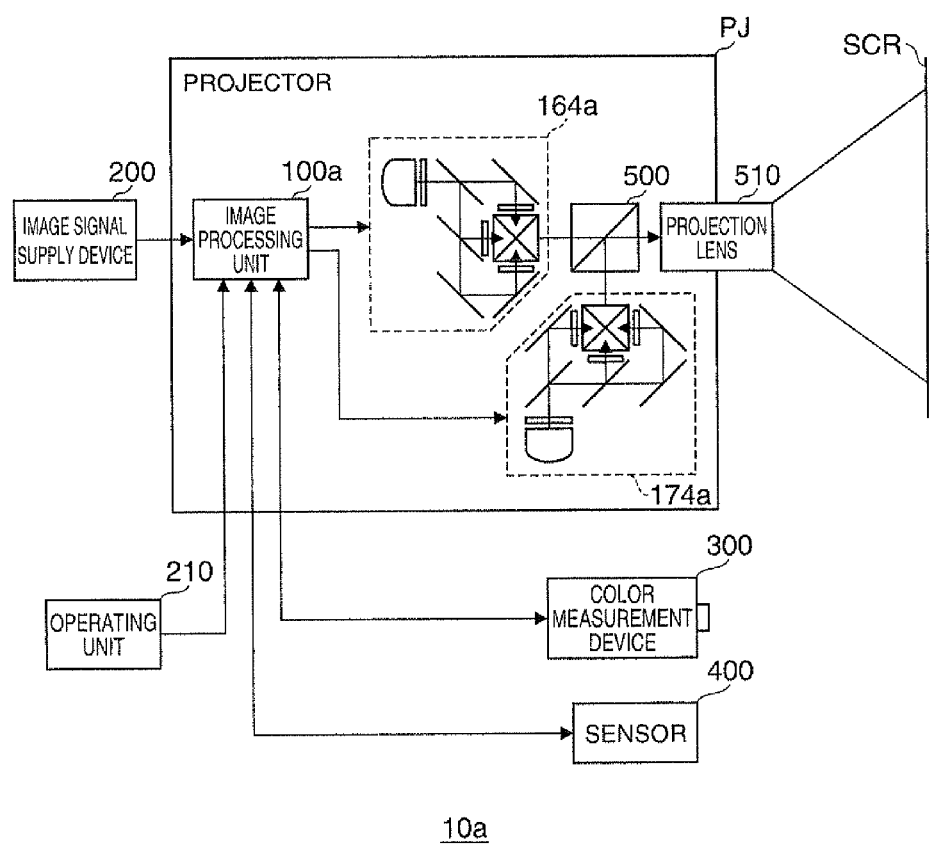
FIG. 20 is a block diagram of a configuration example of an image display system according to a third modification of the first embodiment.

FIG. 20 is a block diagram showing a configuration example of an image display system according to a third modification of the first embodiment. In FIG. 20, the same portions as those in FIG. 1 are represented by the same reference numerals, and description thereof will not be repeated. With regard to the configuration of the first image forming unit and the second image forming unit, a configuration when viewed from the top is shown schematically.

A projector PJ includes a first image forming unit 164a, a second image forming unit 174a, an image processing unit (image processor) 100a, a polarization synthesis prism (Polarization Beam Splitter: PBS) 500, and a projection lens 510. The projector PJ projects two images formed by the first image forming unit 164a and the second image forming unit 174a in a superimposed manner, thereby displaying a stack image on the screen SCR. The first image forming unit 164a is different from the first image forming unit 164 in that no projection lens is provided, and a first unevenness correction LUT storage unit and a first unevenness correction process unit are provided. The second image forming unit 174a has the same configuration as the first image forming unit 164a. That is, the second image forming unit 174a is different from the second image forming unit 174 in that no projection lens is provided, and a second unevenness correction LUT storage unit and a second unevenness correction process unit are provided. The image processing unit 100a has the same configuration as the image processor 100 in the first embodiment or the first modification or the second modification of the first embodiment.

In the projector PJ, the first image forming unit 164a modulates light from the light source subjected to dimming control with the dimming rate α on the basis of an image signal after color correction for each color component of RGB, and synthesizes the color light components after modulation in a cross dichroic prism. Similarly, the second image forming unit 174a modulates light from a light source subjected to dimming control with the dimming rate β on the basis of an image signal after color correction for each color component of RGB, and synthesizes the color light components after modulation in a cross dichroic prism. The polarization synthesis prism (synthesis unit) 500 synthesizes the synthesized light from the first image forming unit 164a and the synthesized light from the second image forming unit 174a, and irradiates the resultant light onto the projection lens 510. The projection lens 510 projects the light irradiated from the polarization synthesis prism 500 on a magnified scale to display an image on the screen SCR.

The optical system of the first image forming unit 164a and the optical system of the second image forming unit 174a are reversed. For this reason, the image processing unit 100a supplies, to the second image forming unit 174a, an image signal of the orientation of pixels horizontally opposite to the orientation of pixels of an image represented by an image signal supplied to the first image forming unit 164a. In this way, it is possible to arrange the direction of the image formed by the first image forming unit 164a and the direction of the image formed by the second image forming unit 174a.

In the third modification, the images formed by the first image forming unit 164a and the second image forming unit 174a accommodated in one housing are projected on the screen SCR in a superimposed manner, such that a stack image is displayed. At this time, in the image processing unit 100a, the same color correction and dimming control as in the first embodiment, the first modification, or the second modification are performed, thereby obtaining the same effects as in the first embodiment, the first modification, or the second modification.

Second Embodiment

Although in the first embodiment or the modifications of the first embodiment, the optimization of color correction and dimming control has been described, the invention is not limited thereto and may be applied to the optimization of unevenness correction and dimming control. In a second embodiment, color correction in the first embodiment or the first modification or the second modification of the first embodiment is performed for respective points within the screen (a plurality of pixel positions within the screen), thereby matching chromaticity over the entire screen and matching luminance between the points within the screen.

Figure 21:
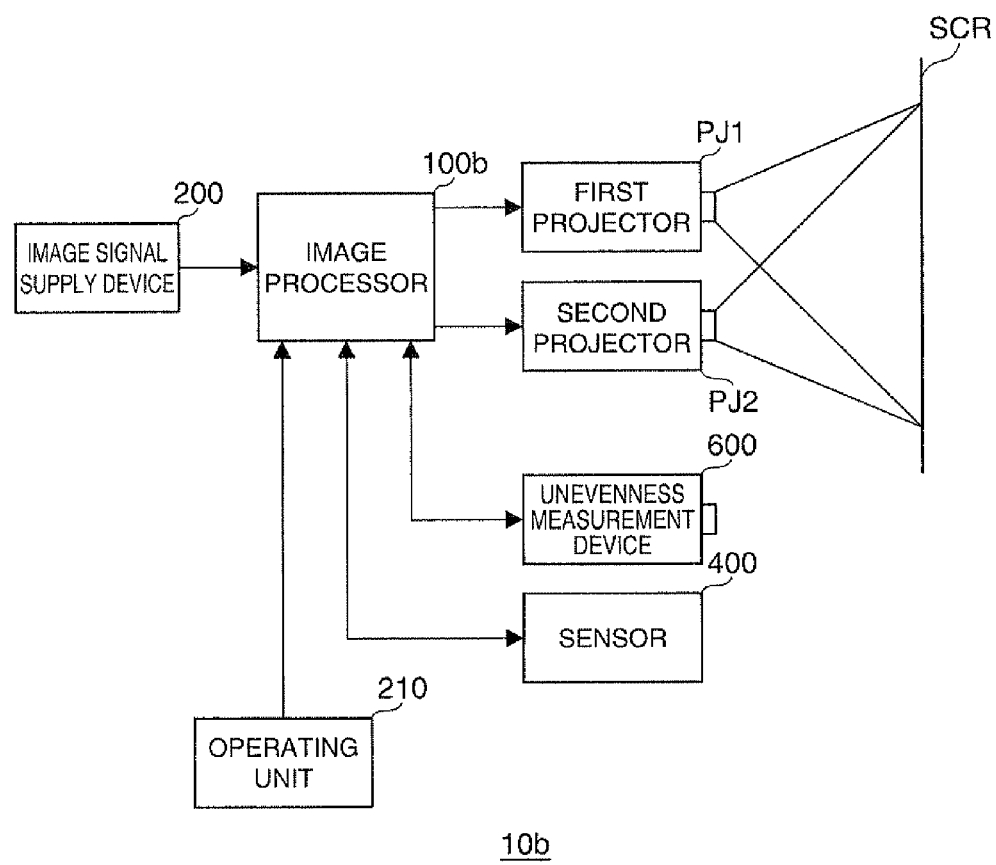
FIG. 21 is a block diagram of a configuration example of an image display system according to a second embodiment of the invention.

FIG. 21 is a block diagram showing a configuration example of an image display system according to the second embodiment of the invention. In FIG. 21, the same portions as those in FIG. 1 are represented by the same reference numerals, and description thereof will not be repeated.

An image display system 10b of the second embodiment includes a first projector PJ1, a second projector PJ2, an image processor 100b, an image signal supply device 200, and an operating unit 210. For the optimization of unevenness correction and dimming, the image display system 10 can include an unevenness measurement device 600 and a sensor 400.

The image processor 100b generates an unevenness correction value for an unevenness correction process corresponding to each projector on an input image signal in accordance with a designated dimming rate, and controls the dimming of at least one of the first projector PJ1 and the second projector PJ2. The image processor 100b has the same configuration as in FIG. 2, and includes an unevenness correction value calculation unit, instead of the color correction value calculation unit 110 of FIG. 2. The unevenness correction value calculation unit includes an unevenness correction target value calculation unit and an unevenness correction LUT generation unit.

The unevenness measurement device 600 is a two-dimensional image sensor, such as a CCD (Charge Coupled Device) sensor, and is provided to measure an image projected on the screen SCR. The unevenness measurement device 600 captures a gray image and a solid image including an intermediate gradation of 0% to 100% of RGB displayed on the screen SCR by the projectors during unevenness measurement. The unevenness measurement device 600 acquires XYZ tristimulus values of the CIE 1931 calorimetric system or RGB in-plane distribution (intensity distribution) information as color characteristic values. As the unevenness measurement device 600, one (for example, ProMetric manufactured by Radiant Imaging, or the like) which captures an image using a filter with spectral sensitivity approximate to an xyz color-matching function, and obtains XYZ tristimulus values through a matrix correction operation is used. As the unevenness measurement device 600, one which captures an image using a RGB filter different from a color-matching function to obtain a RGB image may be used. The in-plane distribution information acquired by the unevenness measurement device 600 for each projector is sent to the image processor 100b as the color characteristic values (intensity distribution of luminance/chromaticity) which are the unevenness measurement values. The measurement process in the unevenness measurement device 600 may be performed under the control of the image processor 100b.

Figure 22:
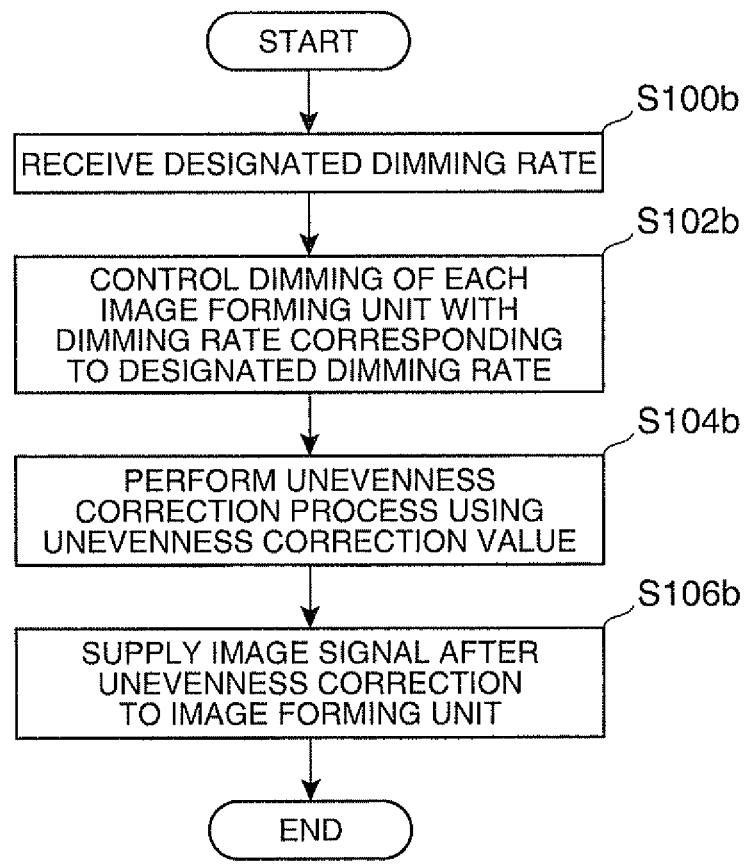
FIG. 22 is a flowchart of an example of an image process in the image display system of the second embodiment.

FIG. 22 is a flowchart of an example of an image process in the image display system 10b of the second embodiment. Although the image process shown in FIG. 22 is performed in the image processor 100b, the first projector PJ1, and the second projector PJ2, the overall process may be performed in the image processor 100b.

First, the image processor 100b receives operation information from the operating unit 210 or sensor information from the sensor 400 to receive a designated dimming rate (Step S100b). The image processor 100b may perform a process for determining the designated dimming rate on the basis of the operation information from the operating unit 210 or the sensor information from the sensor 400.

Next, the dimming control unit 140 references the dimming rate storage unit 130 and controls the dimming of the image forming units with the dimming rates set in the image forming units in response to the designated dimming rate received in Step S100b (Step S102b, a dimming control step).

Each projector includes an unevenness correction LUT storage unit. Each projector performs an unevenness correction process on an image signal corresponding to the image forming unit using the unevenness correction value corresponding to the dimming rate of the corresponding image forming unit in Step S102b (Step S104b, an unevenness correction process step). Step S102b and S104b may be reversed. In each projector, the image signal subjected to the unevenness correction process in Step S104b is supplied to the corresponding image forming unit (Step S106b), and a sequence of processes ends (end).

Accordingly, through the cooperation with the unevenness correction process which realizes display of a stack image with a uniform target chromaticity without unevenness, it is possible to adjust the luminance of the light sources of the projectors with the dimming rates different from the designated dimming rate. As a result, it is possible to increase the light use efficiency without wastefully decreasing the luminance of the light source.

Figure 23:
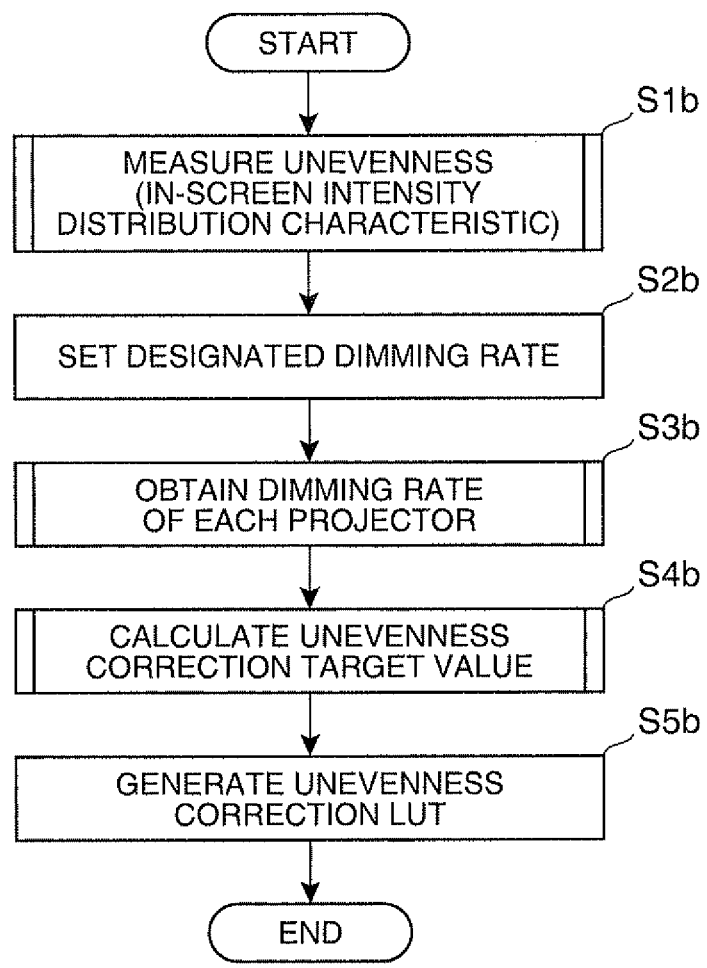
FIG. 23 is a flowchart of a process example of an image processor according to the second embodiment.

FIG. 23 is a flowchart of a process example of the image processor 100b.

Figure 24:
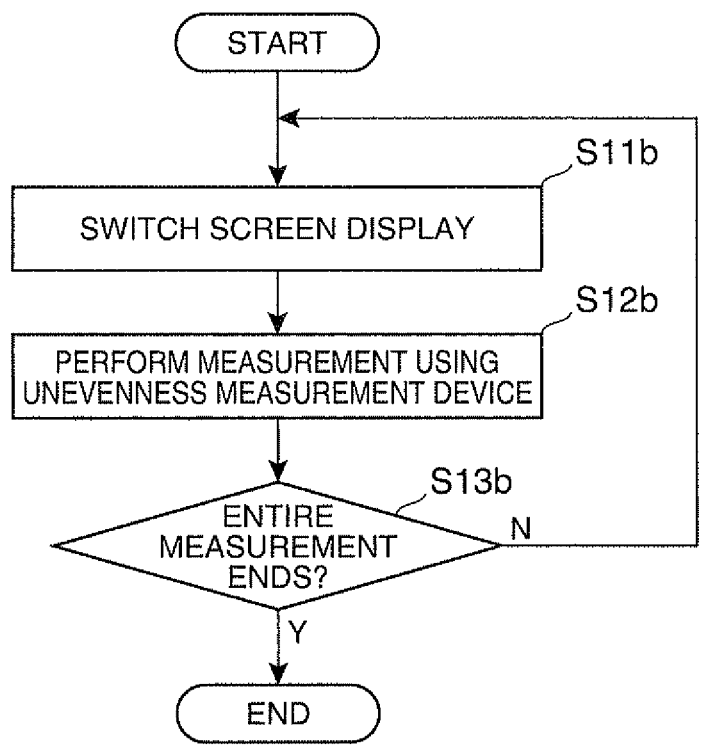
FIG. 24 is a flowchart of an example of an unevenness measurement process in Step S1b of FIG. 23.

FIG. 24 is a flowchart of an example of an unevenness measurement process in Step S1b of FIG. 23.

When the image processor 100b realizes the process of FIG. 23 or 24 through a software process, a program which realizes the following process is stored in the memory which is embedded in the image processor 100b, and the CPU which reads the program performs a process corresponding to the program.

First, the image processor 100b controls the unevenness measurement device 600 and acquires an XYZ value distribution, which is the measurement result of the unevenness measurement device 600, as the unevenness measurement values of the projectors (Step S1b).

In Step S1b, first, each projector projects one of the solid images of the entire screen of the respective gradations of gray and RGB colors on the screen SCR (Step S11b). In this state, the image processor 100b performs control for measuring the XYZ value distribution within the screen using the unevenness measurement device 600, and acquires the XYZ values as the unevenness measurement values (Step S12b). Thereafter, when the entire measurement does not end (Step S13b: N), the image processor 100b returns to Step S11b, and projects the next solid image on the screen SCR. In this way, if the unevenness measurement values are acquired for all the solid images of the entire screen of the respective gradations of gray and RGB colors (Step S13b: Y), the image processor 100b ends the process of Step S1b (end).

Subsequently, the image processor 100b obtains target light source luminance from the operation information from the operating unit 210 or the sensor information from the sensor 400 in the designated dimming rate generation unit 122, and sets a designated dimming rate δ corresponds to the target light source luminance (Step S2b).

The image processor 100b calculates the light source luminance of the projectors from the XYZ value distribution of white and the target light source luminance (=designated dimming rate δ) in the light source luminance calculation unit 124, and obtains the dimming rates α and β corresponding to the light source luminance (Step S3b).

Next, the image processor 100b calculates the unevenness correction target value in the stack state in each gradation from the light source luminance of the projectors and the unevenness measurement values in the respective gradations of the projectors acquired in Step S1b in the unevenness correction target value calculation unit (not shown) (Step S4b).

Thereafter, the image processor 100b generates the unevenness correction LUT on the basis of the unevenness correction target value in the unevenness correction LUT generation unit (not shown) (Step S5b).

The unevenness correction LUT generated in Step S5b is stored in the unevenness correction LUT storage unit of each projector. Subsequently, the image processor 100b performs dimming control of the projectors with the dimming rates calculated in Step S3b, and performs the unevenness correction process with reference to the unevenness correction LUT generated in Step S5b.

Figure 25:
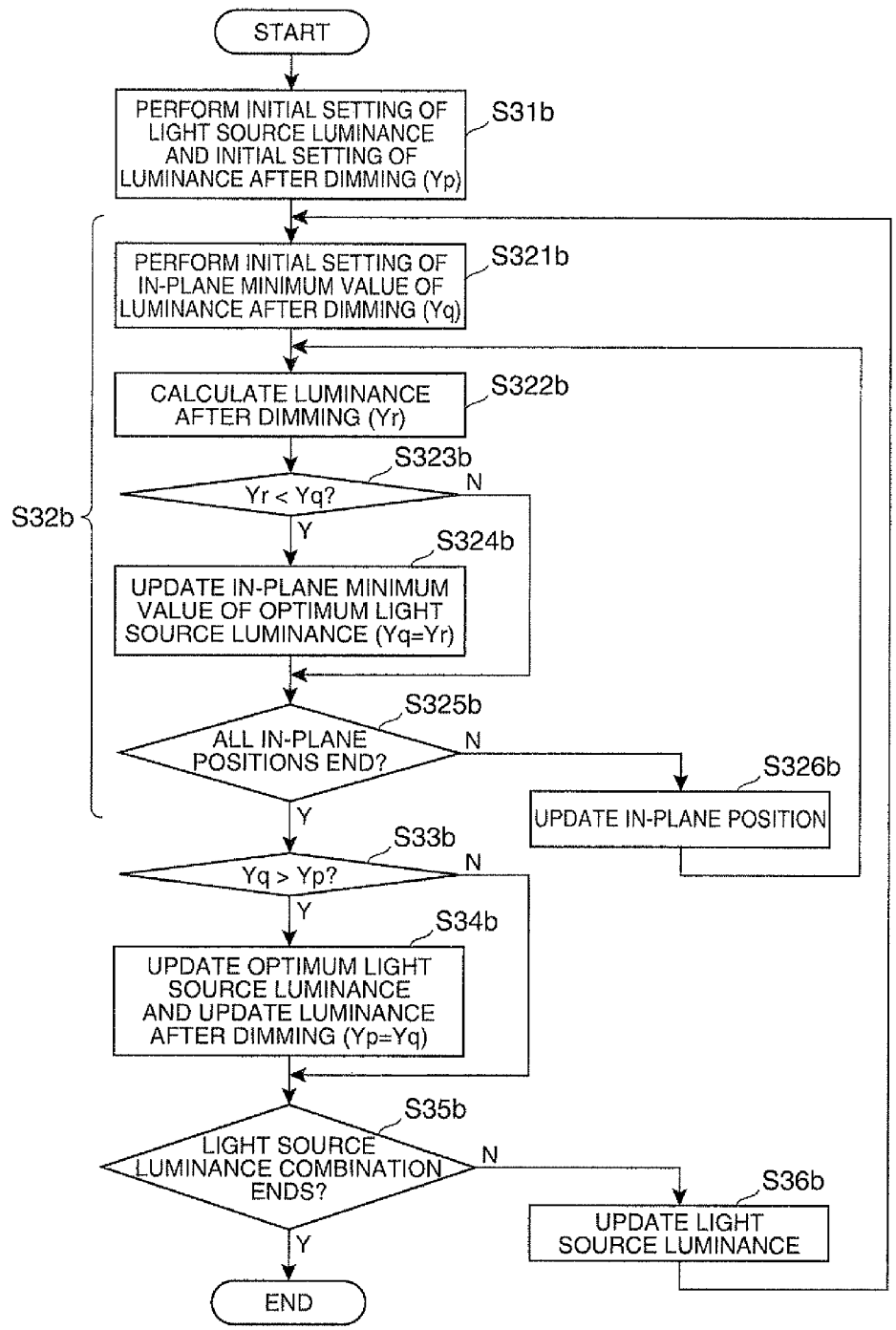
FIG. 25 is a flowchart of an example of a light source luminance calculation process in Step S3b of FIG. 23.

FIG. 25 is a flowchart of an example of a light source luminance calculation process in Step S3b of FIG. 23.

First, prior to searching the dimming rates α and β, the light source luminance calculation unit 124 performs the initial settings of the dimming rates α and β corresponding to the light source luminance and the luminance Yp after dimming (Step S31b).

Next, the light source luminance calculation unit 124 calculates luminance Yq after dimming (Step S32b).

In Step S32b, first, the light source luminance calculation unit 124 performs the initial setting of the in-plane minimum value of the luminance Yq after dimming (Step S321b). Next, the light source luminance calculation unit 124 obtains the value of the right side of Expression (6-3) using the dimming rates α and β and sets the value to a variable Yr (Step S322b). Subsequently, the light source luminance calculation unit 124 compares Yq with Yr obtained in Step S322b (Step S323b), and when Yq is greater than Yr (Step S323b: Y), substitutes Yr into Yq as the in-plane minimum value of the luminance after dimming (Step S324). When Yq is equal to or smaller than Yr, Yq is maintained. When all the in-plane positions are not completed (Step S325b: N), the in-plane position is updated (Step S326b), and the process returns to Step S322b.

When all the in-plane positions are completed (Step S325b: Y), the light source luminance calculation unit 124 compares Yp with Yq at that time (Step S33b). When Yq is greater than Yp (Step S33b: Y), the light source luminance calculation unit 124 updates the dimming rates α and β corresponding to Yq as an optimum light source luminance, and substitutes Yq into the luminance Yp after dimming (Step S34b).

When all the combinations of the light source luminance do not end (Step S35b: N), the light source luminance calculation unit 124 updates the dimming rates α and β (Step S36b), and the process returns to Step S321b.

In Step S35b, when all the combinations of the light source luminance end (Step S35b: Y), the light source luminance calculation unit 124 ends a sequence of processes (end), and determines the dimming rates α and β at that time as the dimming rates of the projectors.

FIG. 26 is an explanatory view of an example of a light source luminance calculation process according to the second embodiment. FIG. 26 shows an example of a process for calculating the dimming rates α and β, in which the minimum value of Y from among the XYZ values within the plane is maximal, at nine points (pixel positions P1 to P9) within the screen.

Figure 27:
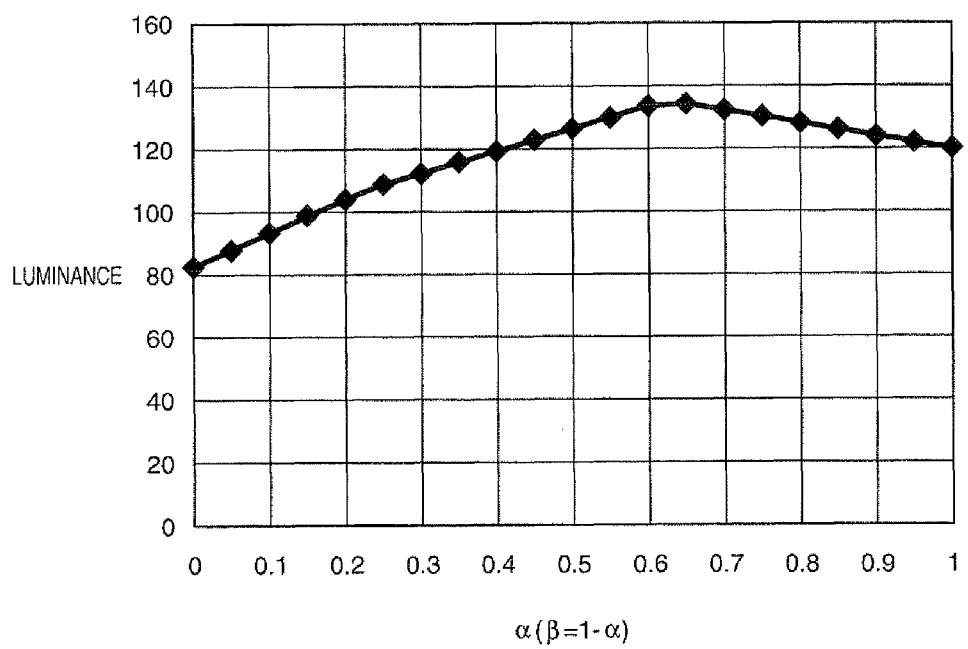
FIG. 27 is a diagram showing a calculation example of a dimming rate by a light source luminance calculation unit according to the second embodiment.

FIG. 27 shows a calculation example of the dimming rates α and β using the light source luminance calculation unit according to the second embodiment. FIG. 27 shows the relationship between the dimming rate α and in-plane minimum luminance when the color characteristic of the first projector PJ1 is as shown in FIG. 9A and the color characteristic of the second projector PJ2 is as shown in FIG. 10A. In FIG. 27, the horizontal axis represents α and the vertical axis represents luminance.

As a result of applying the combination of the dimming rates α and β to the XYZ values of white of the first projector PJ1 and the second projector PJ2 at each position within the screen, as shown in FIG. 26, the pixel position P4 when the dimming rate α is 0.5 has the in-plane minimum luminance. Meanwhile, the pixel position P2 when the dimming rate α is 0.65 has the in-plane minimum luminance. As described above, if the in-plane minimum luminance changes as shown in FIG. 27 while changing the dimming rate α (β), it is understood that, when the dimming rate α is 0.65 and the dimming rate β is 0.35, the in-plane minimum luminance has a maximum value.

If the dimming rates α and β are obtained in the above-described manner, as in the first embodiment, in Steps S4b and S5b of FIG. 23, the unevenness correction target value in the stack state is calculated. That is, it should suffice that the XYZ values in the stack state of the respective gradations from black to white are obtained at each in-plane position, and the color correction LUT at each in-plane position is generated as an unevenness correction LUT.

Although in the second embodiment, a configuration in which the image processor is externally attached to the two projectors each having the image forming unit has been described, the invention is not limited thereto. For example, as in the third modification of the first embodiment, the second embodiment may be applied to an image display system which has a plurality of image forming units in a housing, synthesizes image light from the image forming units in the housing, and projects the synthesized image light on the screen SCR.

As described above, according to the second embodiment, it is possible to improve the light use efficiency and to display a brighter image with the same power consumption while realizing image display with a uniform target chromaticity without unevenness. At this time, since color correction is performed while a plurality of projectors are regarded as a single projector, it should suffice that the unevenness correction LUT is generated for one projector, thereby achieving efficient unevenness correction.

Although the image processing method, the projector, the image display system, and the like according to the invention have been described on the basis of the foregoing embodiments or the modifications, the invention is not limited to the foregoing embodiments or the modifications. Various modifications may be made without departing from the subject matter of the invention. For example, the following modifications may be made.

(1) Although in the foregoing embodiments or the modifications, an example where images formed by two image forming units are stacked has been described, the same applies to a case where images formed by three or more image forming units are stacked. In this case, since the combinations of the light source luminance of the image forming units become enormous, it is desirable to increase the dimming rate change step or to place a restriction on the minimum value of the dimming rate of each projector.

(2) Although in the foregoing embodiments or the modifications, light reduction when dimming is performed has been described, the invention is not limited thereto. For example, the improvement in brightness with light increasing can be realized through the same process. It should suffice that the designated dimming rate δ is δ≥1.

(3) Although in the foregoing embodiments or the modifications, the projector has been described, the invention is not limited thereto. The invention can be of course applied to all apparatuses which display images on the basis of image signals in a superimposed manner.

(4) Although in the foregoing embodiments or the modifications, an example where an image forming unit is an optical modulator using a so-called three-plate transmissive liquid crystal panel has been described, an optical modulator using a single-plate, two-plate, or four or more-plate transmissive liquid crystal panel may be used. Although a case where a light valve using a transmissive liquid crystal panel is used as an optical modulator has been described, the invention is not limited thereto. For example, a DLP (Digital Light Processing) (Registered Trademark), an LCOS (Liquid Crystal On Silicon), or the like may be used as an optical modulator.

(5) Although in the foregoing embodiments or the modifications, the invention has been described as an image processing method, an image processor, an image display system, and the like, the invention is not limited thereto. For example, the invention may relate to a program in which the procedure of an image processing method according to the invention, a method of generating a color correction value, or a method of generating an unevenness correction value is described, a program in which the procedure of a processing method (image display method) of an image display device for realizing the invention is described, or a recording medium having recorded thereon any of these programs.

The entire disclosure of Japanese Patent Application No. 2011-152739, filed Jul. 11, 2011 is expressly incorporated by reference herein.

What is claimed is:

1. An image processing method which performs color correction on a superimposed image obtained by superimposing a first image formed by a first image forming unit and a second image formed by a second image forming unit, the method comprising:

storing a first dimming rate for the first image forming unit and a second dimming rate for the second image forming unit corresponding to an overall dimming rate specified by a user;

controlling the dimming of the first image forming unit on the basis of the first dimming rate corresponding to the overall dimming rate specified by the user;

controlling the dimming of the second image forming unit on the basis of the second dimming rate corresponding to the overall dimming rate specified by the user;

performing a color correction process on image signals corresponding to the first image forming unit using a first color correction value corresponding to the first dimming rate; and performing a color correction process on image signals corresponding to the second image forming unit using a second color correction value corresponding to the second dimming rate.

2. The method according to claim 1,
wherein the first and second color correction values are color correction values which corresponds to a value obtained by totaling the color characteristic values of the first image and the second image in accordance with the first and second dimming rates of the first image forming unit and the second image forming unit.

3. The method according to claim 1, further comprising:
calculating a color correction target value corresponding to the first image forming unit and the second image forming unit on the basis of a value obtaining by totaling the color characteristic values of the first image and the second image in accordance with the first and second dimming rates of the first image forming unit and the second image forming unit; and
generating the color correction value corresponding to the first image forming unit and the second image forming unit on the basis of the color correction target value calculated in the calculating of the color correction target value,
wherein, in the performing of the color correction process, the color correction process is performed using the color correction value generated in the generating of the color correction value.

4. The method according to claim 1, further comprising:
calculating the first and second dimming rates of the first image forming unit and the second image forming unit on the basis of the designated dimming rate and the color characteristic values of the first image and the second image,
wherein, in the controlling of the dimming, the dimming of the first image forming unit and the second image forming unit is performed on the basis of the first and second dimming rates calculated in the calculating of the dimming rates.

5. The method according to claim 1,
wherein the average value of the first and second dimming rates of the first image forming unit and the second image forming unit is equal to the designated dimming rate.

6. The method according to claim 1,
wherein the color correction process and the dimming of the first image forming unit and the second image forming unit are performed at each of a plurality of pixel positions within a screen to correct unevenness within the screen.

7. An image processor which performs color correction on a superimposed image obtained by superimposing a first image formed by a first image forming unit and a second image formed by a second image forming unit, the image processor comprising:
a dimming rate storage unit that stores a first dimming rate for the first image forming unit and a second dimming rate for the second image forming unit corresponding to an overall dimming rate specified by a user;
a dimming control unit that controls the dimming of the first image forming unit on the basis of the first dimming rate corresponding to the overall dimming rate specified by the user and controls the dimming of the second image forming unit on the basis of second dimming rate corresponding to the overall dimming rate specified by the user;
a color correction target value calculation unit that calculates a first color correction target value corresponding to the first dimming rate for the first image forming unit and calculates a second color correction target value corresponding to the second dimming rate for the second image forming unit on the basis of a value obtained by totaling color characteristic values of the first image and the second image in accordance with the first and second dimming rates of the first image forming unit and the second image forming unit; and
a color correction value generation unit that generates a first color correction value corresponding to the first image forming unit and generates a second color correction value corresponding to the second image forming unit on the basis of the color correction target value calculated by the color correction target value calculation unit.

8. The image processor according to claim 7, further comprising:
a light source luminance calculation unit that calculates the first and second dimming rates of the first image forming unit and the second image forming unit on the basis of the overall dimming rate specified by the user and the color characteristic values of the first image and the second image,
wherein the dimming control unit controls the dimming of the first image forming unit and the second image forming unit on the basis of the first and second dimming rates calculated by the light source luminance calculation unit.

9. An image display system comprising:
the image processor according to claim 7;
a first image display device that has the first image forming unit whose dimming is controlled by the dimming control unit and performs a color correction process on an image signal corresponding to the first image forming unit using the color correction value generated in the image processor; and
a second image display device that has the second image forming unit whose dimming is controlled by the dimming control unit and performs a color correction process on an image signal corresponding to the second image forming unit using the color correction value generated in the image processor.

10. An image display system comprising:
the image processor according to claim 8;
a first image display device that has the first image forming unit whose dimming is controlled by the dimming control unit and performs a color correction process on an image signal corresponding to the first image forming unit using the color correction value generated in the image processor; and
a second image display device that has the second image forming unit whose dimming is controlled by the dimming control unit and performs a color correction process on an image signal corresponding to the second image forming unit using the color correction value generated in the image processor.

* * * * *